United States Patent
Kundu et al.

(10) Patent No.: US 11,676,403 B2
(45) Date of Patent: Jun. 13, 2023

(54) COMBINING VISIBLE LIGHT CAMERA AND THERMAL CAMERA INFORMATION

(71) Applicant: Hitachi Automotive Systems, Ltd., Ibaraki (JP)

(72) Inventors: Subrata Kumar Kundu, Canton, MI (US); Naveen Kumar Bangalore Ramaiah, Farmington Hills, MI (US)

(73) Assignee: HITACHI ASTEMO, LTD., Hitachinaka (JP)

( * ) Notice: Subject to any disclaimer, the term of this patent is extended or adjusted under 35 U.S.C. 154(b) by 234 days.

(21) Appl. No.: 17/153,949

(22) Filed: Jan. 21, 2021

(65) Prior Publication Data

US 2022/0230018 A1 Jul. 21, 2022

(51) Int. Cl.
*G06T 7/593* (2017.01)
*G06V 10/25* (2022.01)
*G06V 20/56* (2022.01)

(52) U.S. Cl.
CPC ............ *G06V 20/588* (2022.01); *G06T 7/593* (2017.01); *G06V 10/25* (2022.01); *G06T 2207/10048* (2013.01); *G06T 2207/20228* (2013.01); *G06T 2207/30256* (2013.01)

(58) Field of Classification Search
None
See application file for complete search history.

(56) References Cited

U.S. PATENT DOCUMENTS

| | | | |
|---|---|---|---|
| 2019/0258251 A1* | 8/2019 | Ditty | G06V 20/58 |
| 2020/0253483 A1* | 8/2020 | Chase | G06V 20/56 |
| 2021/0063179 A1* | 3/2021 | Hayes | G01C 21/3807 |
| 2021/0157330 A1* | 5/2021 | Tran | G06N 3/0454 |
| 2022/0172372 A1* | 6/2022 | Willmott | G06T 7/11 |
| 2022/0227364 A1* | 7/2022 | Chase | B60W 30/09 |

FOREIGN PATENT DOCUMENTS

| | | |
|---|---|---|
| JP | 2010163131 A | 7/2010 |
| JP | 2019190838 A | 10/2019 |

* cited by examiner

*Primary Examiner* — Idowu O Osifade
(74) *Attorney, Agent, or Firm* — Mattingly & Malur, PC

(57) ABSTRACT

In some examples, one or more processors may receive at least one first visible light image and a first thermal image. Further, the processor(s) may generate, from the at least one first visible light image, an edge image that identifies edge regions in the at least one first visible light image. At least one of a lane marker or road edge region may be determined based at least in part on information from the edge image. In addition, one or more first regions of interest in the first thermal image may be determined based on at least one of the lane marker or the road edge region. Furthermore, a gain of a thermal sensor may be adjusted based on the one or more first regions of interest in the first thermal image.

17 Claims, 14 Drawing Sheets

COMBINING VISIBLE LIGHT CAMERA AND THERMAL CAMERA INFORMATION

BACKGROUND

Advanced driver assistance systems (ADAS), as well as semi-autonomous vehicle systems, self-driving systems, or otherwise autonomous driving (AD) systems are systems that automate or otherwise enhance vehicle control for improved safety, automated navigation, and the like. These systems typically employ multiple types of sensors for recognizing the roadway and for recognizing and avoiding other vehicles, obstacles, pedestrians, etc. However, it can be challenging to combine and respond to the sensor readings of the multiple sensors in real time with limited processing capabilities in a variety of differing environmental, traffic, and road conditions.

SUMMARY

In some implementations, one or more processors may receive at least one first visible light image and a first thermal image. Further, the processor(s) may generate, from the at least one first visible light image, an edge image that identifies edge regions in the at least one first visible light image. At least one of a lane marker or road edge region may be determined based at least in part on information from the edge image. In addition, one or more first regions of interest in the first thermal image may be determined based on at least one of the lane marker or the road edge region. Furthermore, a gain of a thermal sensor may be adjusted based on the one or more first regions of interest in the first thermal image.

Additionally, in some implementations, one or more processors may receive one or more visible light images and a thermal image. One or more regions of interest may be determined in the thermal image and the one or more regions of interest may be mapped to the one or more visible light images. The processor(s) may generate, from the one or more visible light images, based on the mapping, a disparity map image that combines one or more denser disparity areas corresponding to the one or more regions of interest with one or more sparser disparity areas corresponding to areas outside of the one or more regions of interest.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION

Figure 1:
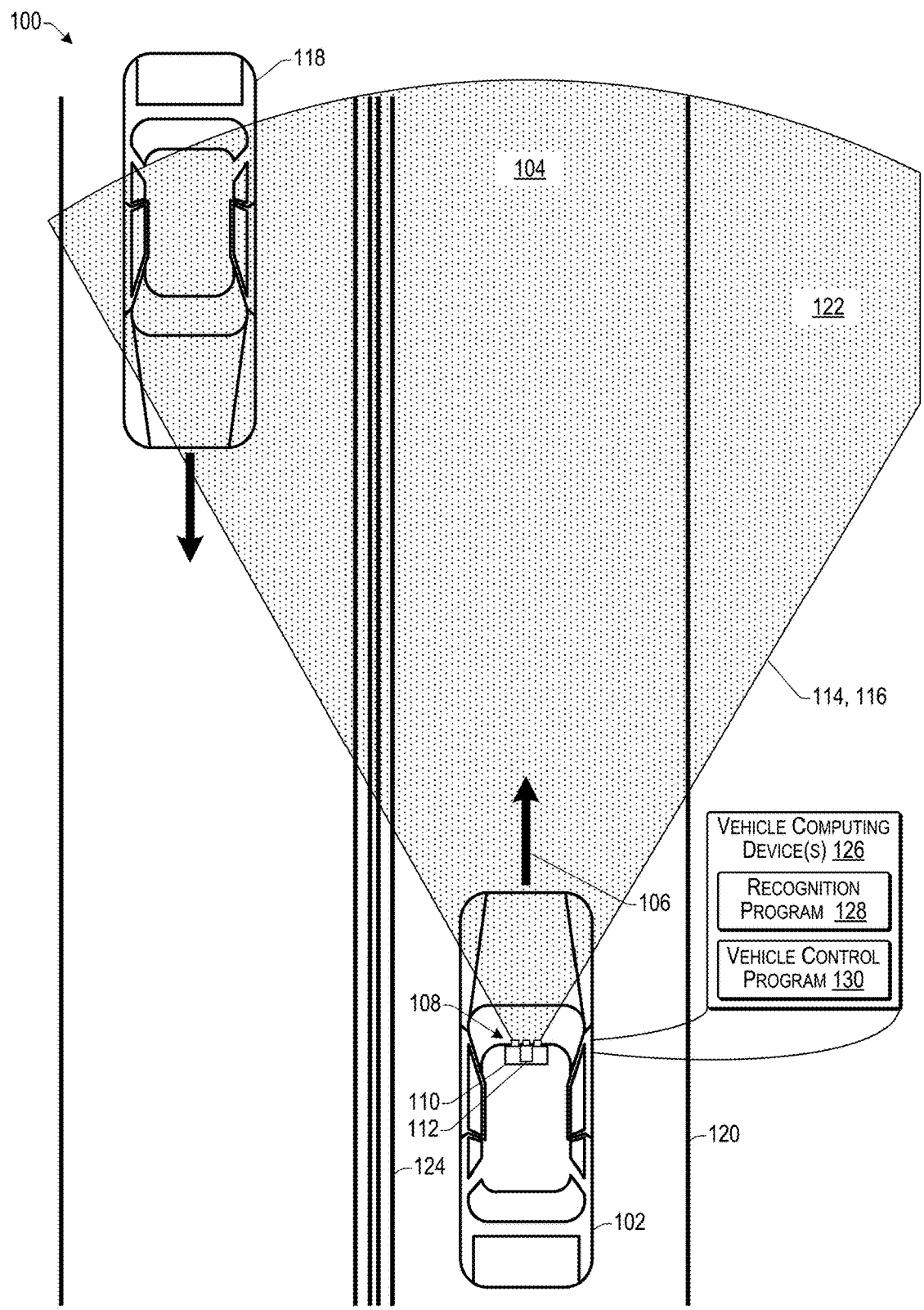
FIG. 1 illustrates an example recognition system configured for performing recognition of the surroundings of a vehicle according to some implementations.

Some implementations herein are directed to techniques and arrangements able to combine the information received from one or more visible light (VL) cameras and one or more thermal cameras for performing recognition, such as roadway recognition, obstacle recognition, obstacle avoidance, or other recognition and navigation-enabling functions. For instance, the implementations herein may generate a disparity map based at least in part on information received from a thermal camera and one or more VL cameras. In addition, implementations herein may perform dynamic adjustment of thermal camera gain for increasing the accuracy of the recognition results herein.

As one example, the techniques described herein may intelligently calculate areas of sparse disparity maps and dense disparity maps to use for obstacle avoidance and other navigation functions based at least in part on thermal camera information. In addition, some examples may perform dynamic adjustments of thermal camera gain values based on edge disparity information determined from images of a VL camera. For instance, the edge disparity information herein may be extracted from images received from a VL camera, such as a mono VL camera or a stereo VL camera.

Some implementations herein improve the detection and recognition of obstacles and road features for all types of weather conditions, such as for AD/ADAS applications. For example, it may be difficult to detect and recognize obstacles, the road surface, signs, traffic light, etc. for all weather and lighting conditions using a single sensor, such as a stereo or mono VL camera alone, or a thermal camera alone. Accordingly, some examples herein provide for efficient fusion of VL camera images and thermal camera images to realize a highly accurate detection and recognition capability for a large number of weather and road conditions.

As one example, the system herein may include a thermal camera and at least one VL camera mounted on the vehicle. The respective fields of view (FOVs) of both the thermal camera and the VL camera(s) may be wide enough to capture the road in front of the vehicle, as well as the road edge and roadside objects. If the FOVs of the thermal camera and VL camera(s) are approximately the same, then the calculations may be somewhat simplified as compared to other examples herein in which the FOVs of the thermal camera and VL camera(s) are different. For example if the FOVs are different, an additional calibration operation may be used to match the FOVs when fusing the images received from the thermal camera and the visible light camera(s). Furthermore, implementations herein are not limited to capturing images of the roadway in front of the vehicle, but may also be employed for capturing images to the side or rear of the vehicle, such as for performing recognition of the entire environment surrounding the vehicle.

Performing reliable recognition of obstacles for various different types of weather conditions may be a challenging issue for ADAS/AD systems. Accordingly, implementations herein include an efficient fusion technique of VL camera images and thermal camera images to enable accurate detection and recognition rates for a large variety of conditions. For instance, some examples herein may use a raw data fusion technique that improves disparity map quality and efficiency, and that provides for automatic adjustment of thermal camera sensor gain for performing recognition of obstacles using fused camera data. This enables the system herein to provide improved recognition performance as compared to conventional solutions. In addition, implementations herein may help provide a comprehensive evaluation of the road scene, such as for detecting obstacles at relatively long distances. In some cases, artificial intelligence may be employed to realize highly accurate recognition performance using VL camera(s) information and thermal camera information.

For discussion purposes, some example implementations are described in the environment of capturing and fusing visible light and thermal images for detecting and recognizing vehicle surroundings. However, implementations herein are not limited to the particular examples provided, and may be extended to other types of cameras, other types of thermal sensing devices, other types of vehicles, other types of roads and obstacles, other weather conditions, and so forth, as will be apparent to those of skill in the art in light of the disclosure herein.

FIG. 1 illustrates an example recognition system 100 configured for performing recognition of the surroundings of a vehicle 102 according to some implementations. In this example, suppose the vehicle 102 is traveling on a roadway or other travel path 104 in a direction indicated by arrow 106. The recognition system 100 herein may include at least one camera system 108, which may be mounted on the vehicle 102. In the illustrated example, the camera system 108 may include a VL camera 110 and a thermal camera 112. In this example, the VL camera 110 is a stereo VL camera. In other examples, the camera system 108 may include one or more mono VL cameras instead of or in addition to the VL stereo camera as the VL camera 110. Further, in some cases, multiple thermal cameras 112 may be included. Additionally, while the cameras 110, 112 in the camera system 108 are illustrated as being co-located on the vehicle roof in this example, in other examples, the thermal camera 112 and/or the VL camera 110 may be located together or separate in any of various different locations on the vehicle 102.

In the illustrated example, an FOV 114 of the VL camera 110 matches an FOV 116 of the thermal camera 112. The camera FOVs 114, 116 may be wide enough to capture the road or other travel path 104 in front of the vehicle 102, approaching vehicle(s) 118, a road edge 120, roadside area 122, road lane markings 124, and so forth. In addition, in other examples, the FOV 114 of the VL camera 110 may differ from the FOV 116 of the thermal camera 112, such as by providing a different angle of image capture, or the like, in at least one of a lateral or vertical direction.

In some cases, the camera system 108 may capture images corresponding to the respective FOVs 114, 116 continually while the vehicle 102 is in operation, e.g., 10 frames per second, 15 frames per second, 30 frames per second, 60 frames per second, or any other desired frequency that provides images at a high enough rate to enable recognition of the travel path 104 and any obstacles in the travel path in time to take evasive action or otherwise adapt to the recognition information. For instance, the image capturing frequency (sampling frequency) of the camera system 108 may increase as the vehicle speed increases. In addition, in some cases, the VL camera 110 may capture images at a sampling frequency that is different from the sampling frequency of the thermal camera 112.

The vehicle 102 may include one or more vehicle computing devices 126, as discussed additionally below. The vehicle computing device(s) 126 may execute a recognition program 128 and a vehicle control program 130. In some cases, the recognition program 128 may receive the images captured by the cameras of the camera system 108 and may perform processing on the images to perform recognition for the current travel path 104 of the vehicle 102. The recognition program 128 may provide recognition information about detected and recognized features and obstacles to the vehicle control program 130 which may initiate one or more actions based on the recognition information, such as issuing an alert for warning a vehicle occupant, braking the vehicle 102, accelerating the vehicle, steering one or more wheels of the vehicle 102, or the like.

In some cases, the camera system 108 may include at least one vehicle computing device 126 that executes the recognition program 128. In other cases, the vehicle computing device(s) 126 may be separate from the camera system 108, and located elsewhere in the vehicle 102 for executing the recognition program 128. In either case, the vehicle computing device(s) 126 may receive images from the camera system 108 and may process the images to detect the road, road features, signs, obstacles, other vehicles, and the like.

In some examples, the recognition program 128 may generate a parallax map from the received images, e.g., using stereo camera images, mono camera images, or images taken from multiple mono cameras. In the case that a mono camera is used, a depth map may be calculated using a trained machine learning model (not shown in FIG. 1). For instance, initially, a set of monocular images and their corresponding ground-truth parallax maps may be captured and used for training the machine learning model. Subsequently, the machine learning model may be used to predict approximate values of the parallax map as a function of newly captured images.

Alternatively, in the case of a stereo camera or multiple cameras, images may be captured by two or more cameras. The captured images may be used to calculate a parallax using block matching techniques, such as semi-global block matching or any other suitable technique. Parallax information may be used to generate a disparity map. In some examples herein, a stereo camera system is used as an example system to explain some example implementations, but those of skill in the art will understand that similar arrangements and techniques may be applied using systems having a single mono camera or multiple mono cameras as well.

Thermal cameras (also sometimes just referred to as "thermal sensors") and VL cameras operate in different spectrums of electromagnetic waves. For example, VL camera sensors, such as for the mono VL cameras and stereo VL cameras described herein, may operate in the visible light spectrum. The infrared (IR) spectrum may range in wavelength from the nominal red edge of the visible spectrum at around 0.75 micrometers to almost as large as 1 millimeter and, therefore, encapsulates most of the thermal radiation emitted by objects near room temperature. Thus, the IR spectrum, which includes thermal radiation, has longer wavelengths than the visible light spectrum and hence is generally invisible to the human eye. As the thermal radiation emitted by objects corresponds to electromagnetic waves typically in the far thermal spectrum, thermal sensors can detect these waves and create a thermal image.

Further, in some examples, the thermal cameras herein may be distinguished from near IR cameras. For example, near IR cameras may detect wavelengths from, e.g., 0.75 to 1.4 micrometers, while the thermal cameras herein may, as an example, may detect wavelengths in a range from 8 to 15 micrometers. Accordingly, in some example, near IR cameras may use the same sensors as VL cameras and may rely on ambient IR light or IR diodes for receiving IR light in the required wavelengths, whereas the thermal cameras here rely on detecting emitted heat in the mid to far IR wavelengths.

In general, VL cameras may provide images for better recognition performance in the daytime as compared to nighttime, such as when considering the detection range, light intensity, and so forth. A disparity map may provide information to enable detection and recognition of features in the FOV, such as the roadway, obstacles, etc., as well as to estimate distances to recognized features. As one example, a disparity map may be created using left and right camera images from a stereo camera. The quality of the disparity map generated may correlate to the quality of the recognition and distance estimation performance. A higher quality disparity map, often called a "dense" disparity map may provide highly accurate information for most of the pixels considered in creating the dense disparity map. On the other hand, a lower-quality disparity map, often called a "sparse" disparity map may provide accurate information only for a limited number of the pixels in the captured images. However, creation of dense disparity maps is comparatively computationally expensive as compared to creation of sparse disparity maps, and may require a more expensive processing unit and memory. Thus, sparse disparity maps may be employed for reducing the computing requirements even though a sparse disparity map may not show the correct information for all of the required pixels.

The thermal cameras herein may provide superior performance in low light conditions as compared to VL cameras. However, a thermal camera may be limited based on the calibration of the thermal sensor's pixel gain, which may make the thermal sensor not sufficiently sensitive during some conditions. Accordingly, implementations herein provide for automatic compensation for sensor pixel gain for various different conditions. For example, late at night, such as when temperatures are lower, the calibration/gain parameters of the thermal camera may be adjusted so that small temperature differentials are able to be detected by the thermal camera. For example, the techniques herein may enable distinguishing between the road surface and lane markers at night based on the intelligent sensor gain adjustment herein.

Implementations herein provide for fusion of VL camera data and thermal camera data to enable superior recognition results. For example, the techniques herein include intelligently determining areas of an image for calculating a dense disparity map and other areas for a sparse disparity map based in part on thermal camera information so that recognition accuracy can be improved while using a lower cost processing unit and memory. For instance, the techniques herein may include fusing thermal and VL image information intelligently for identifying the lower priority areas for which sparse disparity calculations are sufficient and identifying higher priority areas of an image for which dense disparity calculations are appropriate.

Furthermore, the techniques here may include dynamic adjustments of thermal sensor gain values by utilizing edge disparity information determined from one or more VL camera images to increase the detection and recognition accuracy of obstacle and road information at night. As one example, the techniques herein may include changing the gain value of the individual pixel where a long edge is found by a mono/stereo camera.

The thermal images captured herein may provide information based on the detected temperature of each obstacle or other object, road feature, etc. Hence, it is not possible to extract information such as texture, color, and shadows from thermal camera images, which are generally available in VL camera images. Therefore, existing obstacle detection algorithms used with VL spectrum cameras may not be suitable for use with thermal camera images because of the inherent differences between images captured by thermal cameras and images captured by VL cameras.

In some examples herein, to decide areas for generating sparse and dense disparity map information, the system either may employ a thresholding operation followed by a clustering operation or may employ a semantic segmentation network such as by using deep learning or instance segmentation. In the case of the thresholding operation, a first threshold may initially be applied to each of the pixels in the captured image. For instance, pixels having values that are lower than the first threshold may be considered to be low temperature areas and may be removed, while pixels that exceed the threshold may be considered hot spots and may be preserved. Next, using a clustering operation, the lower priority and higher priority areas of the image may be determined. In particular, the lower priority areas may be subject to sparser disparity processing, while the higher priority areas may be subject to denser disparity processing.

Alternatively, when using the semantic segmentation network and deep learning, instance segmentation, or other machine learning model to determine the regions of interest, the pixels in an image may first be classified into a corresponding segment and class. For instance, each class and segment may denote the road surface characteristics. A database (not shown in FIG. 1) of a large set of thermal images may be compiled, which include images captured under a variety of different scenarios and conditions, such as weather, day, night, different road surface types, etc., and which also includes images containing various obstacles and road features, such as pedestrians, vehicles, traffic lights, road curbs, streetlights, traffic signs, and so forth. Once the database and corresponding labels are prepared, the semantic segmentation network may be trained using a portion of the database, and the trained machine learning model may be evaluated using another portion of the database to ensure accurate output. Subsequently, during use, a captured thermal image may be inputted to the trained machine learning model and the trained model may output the regions of interest. Accordingly, the regions of interest may be subject to dense disparity processing, while the remainder of the images may be subject to sparse disparity processing for generating a combined sparse and dense disparity map image.

Figure 2:
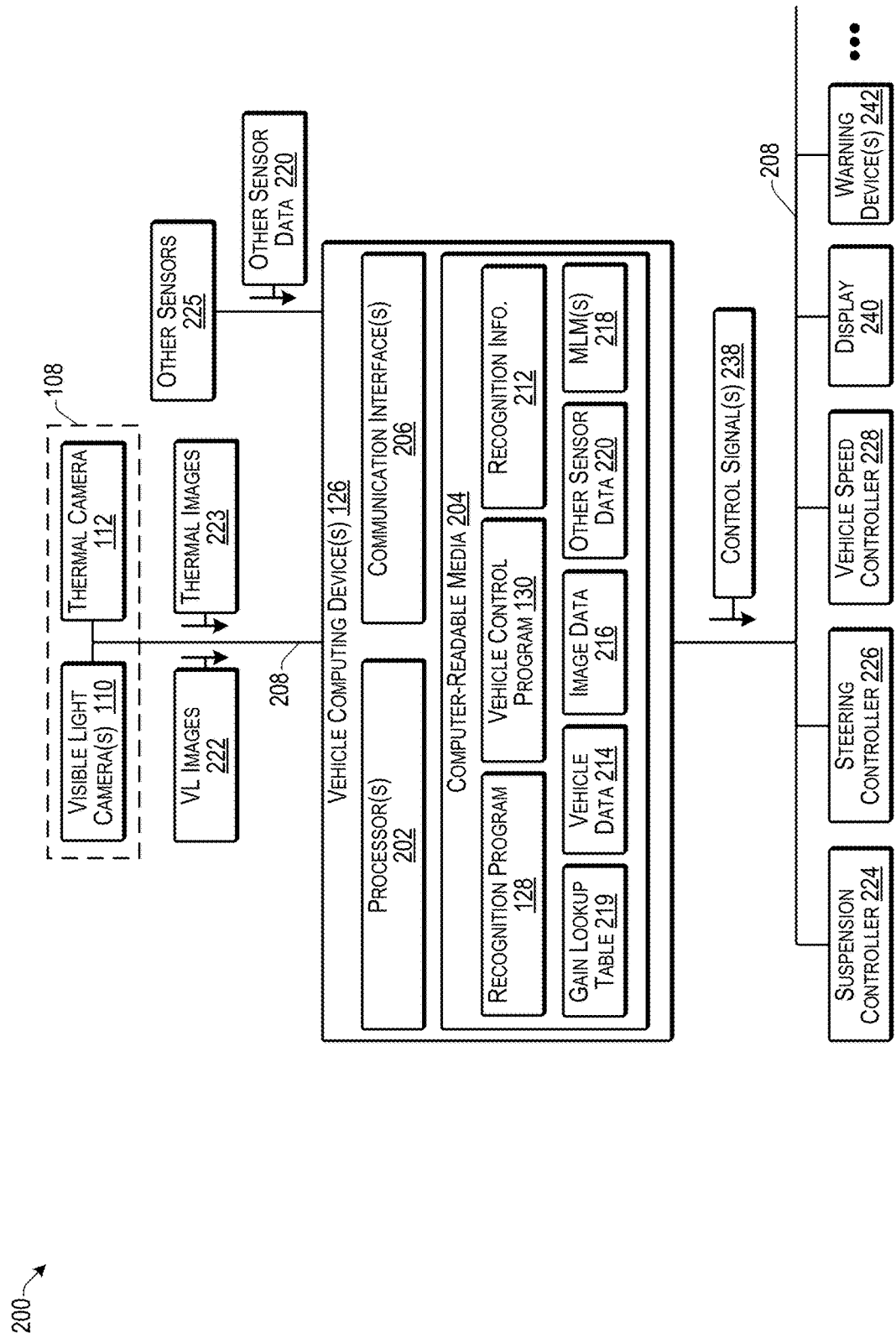
FIG. 2 illustrates an example architecture of a recognition system that may be included in the vehicle 102 according to some implementations.

FIG. 2 illustrates an example architecture of a recognition system 200 that may be included in the vehicle 102 according to some implementations. Each vehicle computing device 126 may include one or more processors 202, one or more computer-readable media 204, and one or more communication interfaces 206. In some examples, the vehicle computing device(s) 126 may include one or more ECUs (electronic control units) or any of various other types of computing devices. For instance, the computing device(s) 126 may include one or more ADAS/AD ECUs for controlling critical vehicle systems to perform ADAS and/or AD tasks, such as navigation, braking, steering, acceleration, deceleration, and so forth. The computing device(s) 126 may also include other ECUs for controlling other vehicle systems.

ECU is a generic term for any embedded system that controls one or more of the systems, subsystems, or components in a vehicle. Software, such as the recognition program 128 and the vehicle control program 130 may be executed by one or more ECUs and may be stored in a portion of the computer-readable media 204 (e.g., program ROM) associated with the respective ECU to enable the ECU to operate as an embedded system. ECUs may typically communicate with each other over a vehicle bus 208 according to a vehicle bus protocol. As an example, the Controller Area Network bus (CAN bus) protocol is a vehicle bus protocol that allows ECUs and other vehicle devices and systems to communicate with each other without a host computer. CAN bus may include at least two different types. For example, high-speed CAN may be used in applications where the bus runs from one end of the environment to the other, while fault-tolerant CAN is often used where groups of nodes are connected together.

Each ECU or other vehicle computing device 126 may include one or more processors 202, which may include one or more of central processing units (CPUs), graphics processing units (GPUs), microprocessors, microcomputers, microcontrollers, digital signal processors, state machines, logic circuits, and/or any devices that manipulate signals based on operational instructions. As one example, the processor(s) 202 may include one or more hardware processors and/or logic circuits of any suitable type specifically programmed or configured to execute the algorithms and other processes described herein. The processor(s) 202 may be configured to fetch and execute computer-readable instructions stored in the computer-readable media 204, which may program the processor(s) 202 to perform the functions described herein.

The computer-readable media 204 may include volatile and nonvolatile memory and/or removable and non-removable media implemented in any type of technology for storage of information, such as computer-readable instructions, data structures, programs, program modules, and other code or data. For example, the computer-readable media 204 may include, but is not limited to, RAM, ROM, EEPROM, flash memory or other memory technology, optical storage, solid state storage, magnetic disk, cloud storage, or any other medium that can be used to store the desired information and that can be accessed by a computing device. Depending on the configuration of the vehicle computing device(s) 126, the computer-readable media 204 may be a tangible non-transitory medium to the extent that, when mentioned, non-transitory computer-readable media exclude media such as energy, carrier signals, electromagnetic waves, and/or signals per se. In some cases, the computer-readable media 204 may be at the same location as the vehicle computing device 126, while in other examples, the computer-readable media 204 may be partially remote from the vehicle computing device 126, such as accessible over a wireless network or the like.

The computer-readable media 204 may be used to store any number of functional components that are executable by the processor(s) 202. In many implementations, these functional components comprise instructions or programs that are executable by the processor(s) 202 and that, when executed, specifically program the processor(s) 202 to perform the actions attributed herein to the vehicle computing device 126. Functional components stored in the computer-readable media 204 may include the recognition program 128 and the vehicle control program 130, each of which may include one or more computer programs, applications, executable code, or portions thereof. Further, while these programs are illustrated together in this example, during use, some or all of these programs may be executed on separate vehicle computing device(s) 126.

In addition, the computer-readable media 204 may store data, data structures, and other information used for performing the functions and services described herein. For example, the computer-readable media 204 may store recognition information 212, vehicle data 214, image data 216, one or more machine learning models (MLM(s)) 218, a gain lookup table 219, other sensor data 220, and so forth. Further, while these data and data structures are illustrated together in this example, during use, some or all of these data and/or data structures may be stored by or with separate computing device(s) 126. The computing device(s) 126 may also include or maintain other functional components and data, which may include programs, drivers, etc., and the data used or generated by the functional components. Further, the computing device(s) 126 may include many other logical, programmatic, and physical components, of which those described above are merely examples that are related to the discussion herein.

The one or more communication interfaces 206 may include one or more software and hardware components for enabling communication with various other devices, such as over the vehicle bus 208 and/or over one or more network(s) (not shown in FIG. 2). For example, the communication interface(s) 206 may enable communication through one or more of a LAN, the Internet, cable networks, cellular networks, wireless networks (e.g., Wi-Fi) and wired networks (e.g., CAN, Fibre Channel, fiber optic, Ethernet), direct connections, as well as close-range communications such as BLUETOOTH®, and the like, as additionally enumerated elsewhere herein.

The computing device(s) 126 may be able to communicate with the camera system 108 via the vehicle bus 208, direct connection, or any other type of connection for receiving image data 216 from the camera system 108. For example, as discussed in detail below, the recognition program 128 may receive the image data 216 from the camera system 108, and may perform recognition of features in the images. In the example of FIG. 2, the received image data 216 may include VL images 222 and thermal images 223. For instance, some or all of the image data 216 may be received as raw image data without any substantial processing. Alternatively, in other examples, as discussed additionally below, e.g., with respect to FIG. 3, the camera system 108 may perform the recognition in the images rather than sending the raw image data to the vehicle computing device 126.

In addition, the computing device(s) 126 may receive vehicle data 214 from other systems and/or other sensors in the vehicle. For instance, the vehicle may include a plurality of other sensors 225 in addition to the camera system 108 that may provide sensor information used by the vehicle control program 130. Several non-exhaustive examples of other sensors 225 may include radar, LIDAR, ultrasound, a global positioning system (GPS) receiver, other cameras, e.g., facing in other directions, and the like. In addition, the vehicle data 214 used by the vehicle control program 130 may include information received from or associated with various vehicle systems, such as from a suspension controller 224 associated with the suspension system, a steering controller 226 associated with the steering system, a vehicle speed controller 228 associated with a braking and acceleration system, and so forth.

As one example, the recognition program 128 may receive the VL images 222 and the thermal images 223 from the camera system 108 continually as the image data 216, e.g., as the camera system 108 captures images of the travel path or other surroundings of the vehicle while the vehicle is in motion. Furthermore, the recognition program 128 may process the received image data 216 to recognize road features, obstacles, and so forth. The recognition program 128 may provide the recognition information 212 about any detected obstacles, road features, etc., to the vehicle control program 130 which may take one or more actions in response to the recognition information. In some examples, the vehicle control program 130 and/or the recognition program 128 may fuse or otherwise combine and consolidate the recognition information 212 determined from the image data 216 with the other sensor data 220 for providing additional available information to vehicle control program 130 for controlling the vehicle.

For example, the vehicle control program 130 may use rule-based and or artificial intelligence-based control algorithms to determine parameters for vehicle control. For instance, the vehicle control program 130 may apply one or more machine learning models (not shown in FIG. 2) for determining an appropriate action, such as braking, steering, decelerating, accelerating, or the like. Furthermore, the vehicle control program 130 may send one or more control signals 238 to one or more vehicle systems in response to the recognition information 212. For example, the vehicle control program 130 may send control signals 238 to the suspension controller 224, the steering controller 226, and/or the vehicle speed controller 228. For instance, the control signals 238 may include a specified spring coefficient and/or damping control information sent to the suspension controller 224; specified steering angle sent to the steering controller 226 for steering one or more wheels; and/or specified braking or acceleration control information sent to the vehicle speed controller 228.

In addition, or alternatively, such as in the case that the vehicle is under control of a driver human driver, the vehicle control program 130 may send a control signal 238 to a display 240 to present an alert and/or to one or more warning devices 242 such as an audible or visual warning device. Examples of warning devices 242 include speakers that may generate an audible alert, haptic devices that may generate a vibration or other type of tactile alert (e.g., in a seat or steering wheel), and/or a visual signaling device that may generate a visual alert.

Figure 3:
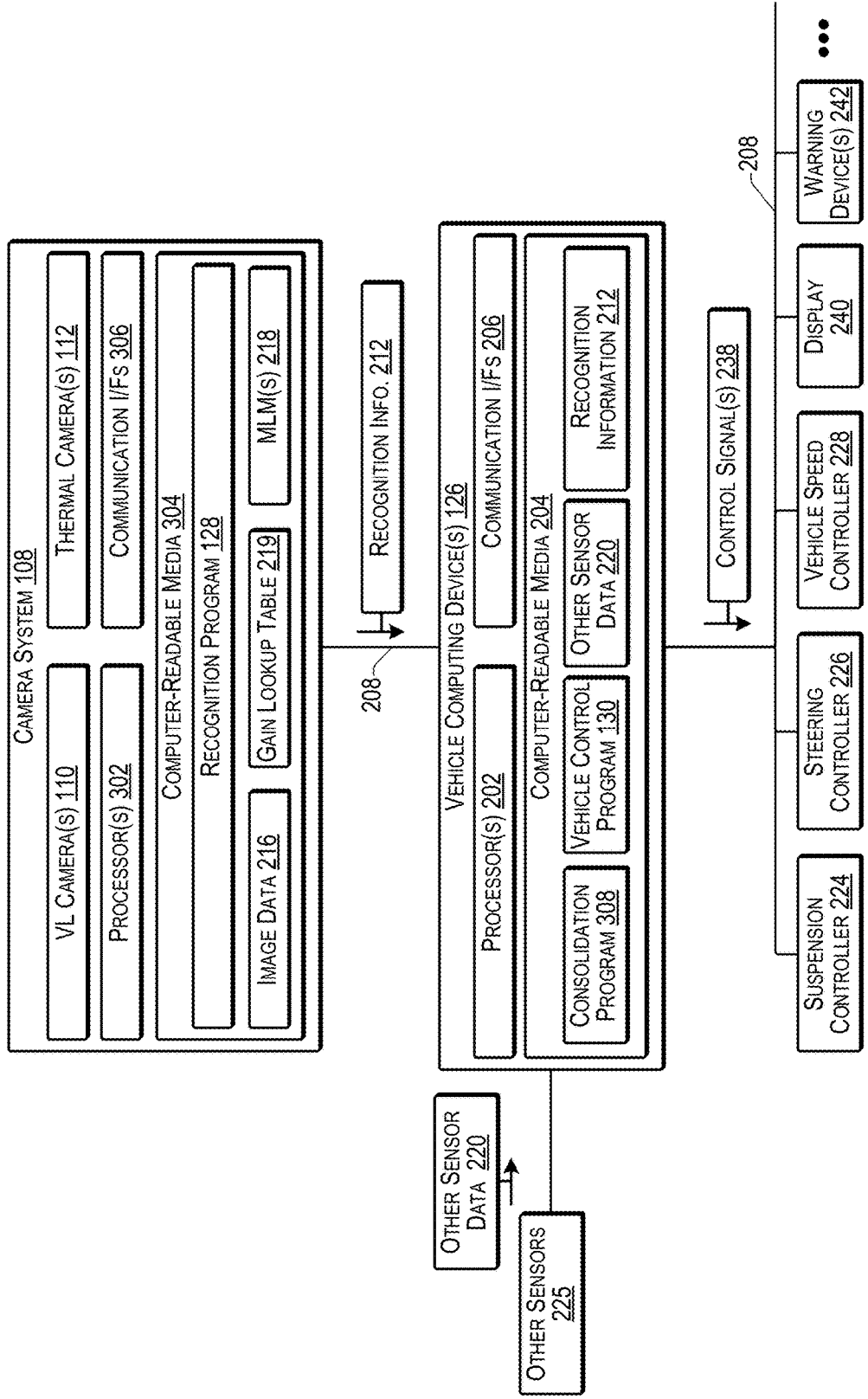
FIG. 3 illustrates an example architecture of a recognition and vehicle control system 300 that may be included in the vehicle according to some implementations.

FIG. 3 illustrates an example architecture of a recognition and vehicle control system 300 that may be included in the vehicle 102 according to some implementations. In this example, the camera system 108 may include processing capability for determining recognition information 212 independently of the vehicle computing device(s) 126. Accordingly, the camera system 180 includes one or more processors 302, one or more computer readable media 304, and or more communication interfaces 306. The one or more processors 302 may be or may include any of the processors 202 discussed above with respect to FIG. 2, or other suitable processors for performing the operations described herein. Furthermore, the one or more computer readable media 302 may be or may include any of the computer readable media 204 discussed above with respect to FIG. 2, or other suitable computer readable media. Similarly, the communication interfaces 306 may be or may include any of the communication interfaces 206 discussed above with respect to FIG. 2 or other suitable communication interfaces.

In addition, the camera system 108 includes the VL camera(s) 110 and the thermal camera(s) 112, which may include one or more lenses, one or more focusing systems, and one or more image sensors and one or more thermal sensors, as is known in the art. In this example, the camera system 108 may execute the recognition program 128 on the one or more processors 302. Accordingly, the VL camera(s) 110 and the thermal camera(s) 112 may capture images in their respective fields of view, and may store the captured images to the computer readable media 304 as image data 216.

In some examples, the recognition program 128 receives the image data 216 from the VL camera(s) 110 and the thermal camera(s) 112. For example, the recognition program 128 may continually receive image data 216 from the VL camera(s) 110 and the thermal camera(s) 112 in a buffer in the computer readable media 304 as the respective VL images and thermal images are captured. Further, the recognition program 128 may perform recognition processing on the received images as described in additional detail below. The recognition program 128 may then send recognition information 212 to the vehicle computing devices 126 in real time. The vehicle control program 130 may then process the recognition information 212 for controlling the vehicle as discussed above with respect to FIG. 2 and as discussed additionally below.

In some examples, the vehicle computing device(s) 126 may execute a consolidation program 308 that may initially receive the recognition information 212 and that may also receive the other sensor data 220. For example, the consolidation program 308 may compare and reconcile the recognition information 212 with the other sensor data to provide a more complete indication of the surroundings of the vehicle to the vehicle control program 130. Similar to the example of FIG. 2 discussed above, the vehicle control program 130 may send one or more control signals 238 to one or more vehicle systems 224, 226, 228, 240, and/or 242 based on the received recognition information 212 and the other sensor data 220. Further, while the VL camera(s) 110 and the thermal camera(s) 112 are described as using the same processor(s) 302 and/or the same vehicle computing devices 126 in some examples herein, in other examples, the VL camera(s) 110 may use one or more different processors 302 and/or different vehicle computing devices 126 from those used by the thermal camera(s) 112.

Figure 4:
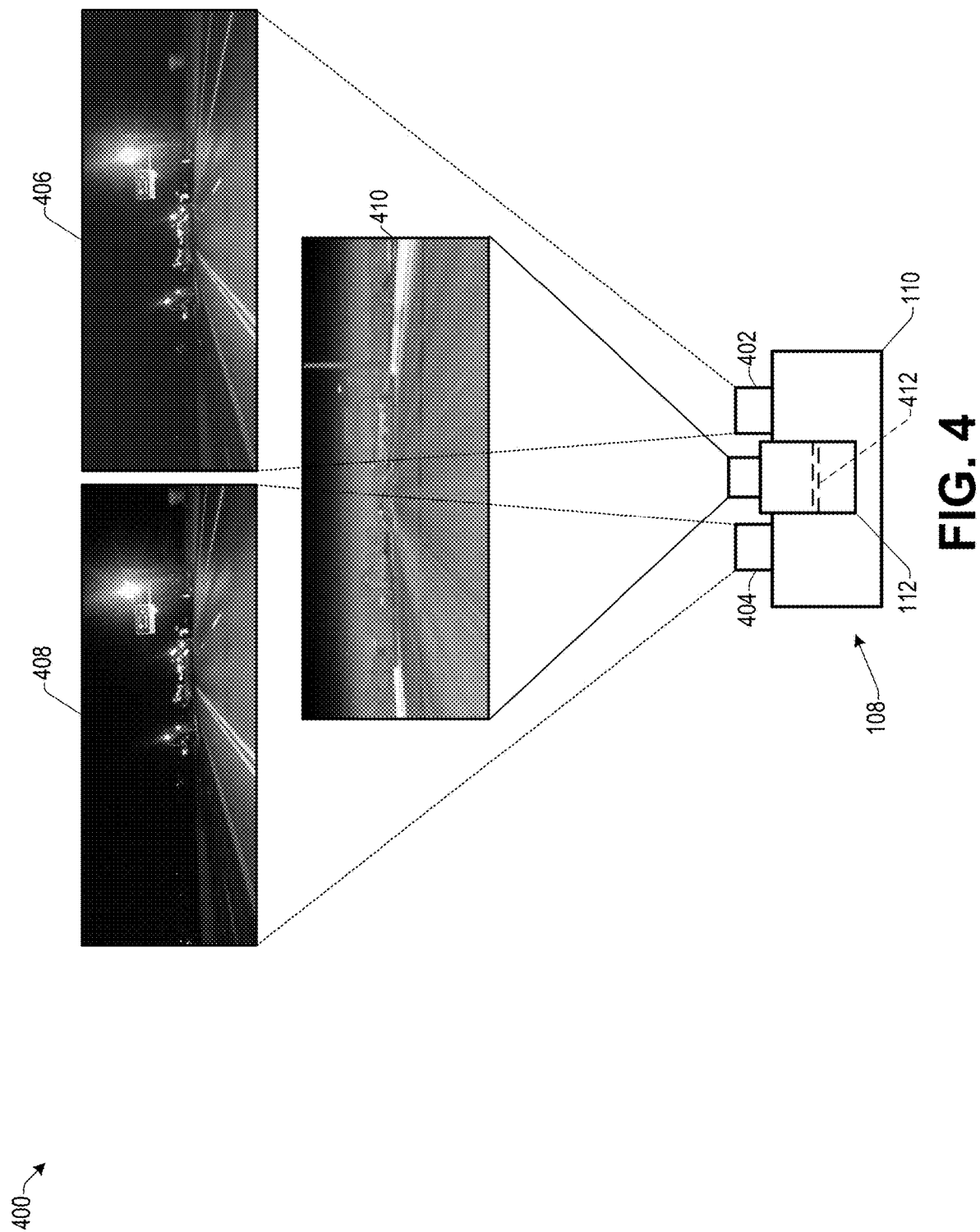
FIG. 4 illustrates an example of image capture performed by the camera system according to some implementations.

FIG. 4 illustrates an example of image capture 400 performed by the camera system 108 according to some implementations. In this example, the camera system 108 includes a stereo VL camera 110 and a thermal camera 112. For instance, the stereo VL camera 112 may include a right lens 402 and a left lens 404. The right lens 402 may capture a right image 406 and the left lens 404 may capture a left image 408. In addition, the thermal camera 112 may capture a thermal image 410 using a thermal sensor 412, such as a microbolometer or the like. As mentioned above, in some examples, the FOV of the stereo VL camera 110 and the FOV of the thermal camera 112 may be approximately the same. In other examples, in which the FOV of the stereo VL camera 110 differs significantly from the FOV of the thermal camera 112, additional transformation calculations may be performed to take into account the differences in the FOVs of the respected cameras 110, 112, for aligning an overlapping portion of the respective FOVs.

As discussed additionally below, the system (e.g., the system 100, 200, and/or 300) may use the right and left images 406 and 408, respectively, to determine a parallax image which is referred to as a disparity map image. For instance, the system may calculate the disparity map image using the two stereo right and left images 406 and 408 based on a block matching method. As one example, as is known in the art, if a point PL=(u1, v1) in the left image 408, the corresponding point PR=(u2, v2) in the right image 406, may be at the same height as PL when v1=v2 as measured from a common baseline. Thus, the parallax measurement can be determined using a simple stereo camera theory in which the parallax may be defined as:

$$d = u2 - u1 \quad \text{EQ(1)}$$

Based on the determined parallax, implementations herein may determine the disparity image by determining the depth information of a 3D point from the parallax since the disparity is inversely proportional to the corresponding parallax. Accordingly, the depth may be calculated using left and right images and the actual disparity, e.g.:

$$Z = fb/d \quad \text{EQ(2)}$$

where Z is the distance (depth) along the camera axis, f is the focal length in pixels, b is a baseline in meters, and d is the disparity in pixels.

In some examples herein, the system may use the thermal image 410, at least in part, for determining which areas of the disparity map image to calculate as a dense disparity map and which other areas may be calculated as a sparse disparity map so that recognition accuracy can be improved while reducing processing time and/or using a lower cost processing unit and memory. For instance, the techniques herein may include considering both the thermal and VL image information intelligently for identifying the lower priority areas of an image for which sparse disparity calculations are sufficient and identifying higher priority areas of the image for which dense disparity calculations are appropriate.

At least a portion of FIGS. 5-8 and 11 include flow diagrams illustrating example algorithms or other processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

Figure 5:
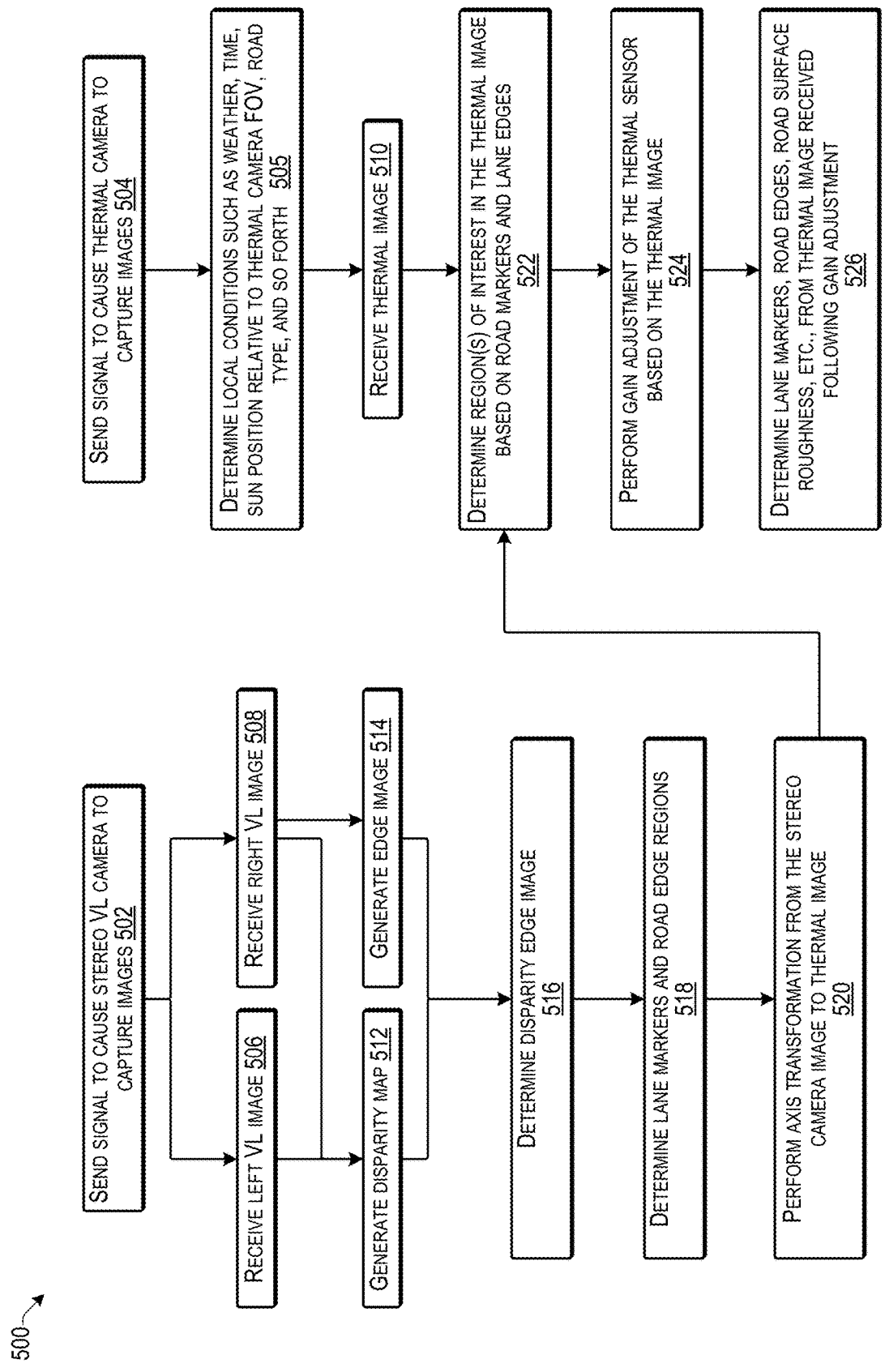
FIG. 5 is a flow diagram illustrating an example process for dynamic gain adjustment using stereo camera images according to some implementations.

FIG. 5 is a flow diagram illustrating an example process 500 for dynamic gain adjustment using stereo camera images according to some implementations. In some examples, the process 500 may be executed by the systems 100, 200, and/or 300 discussed above by execution of the recognition program 128.

At 502, the system may send a signal to cause the stereo VL camera to capture VL images. For example, when the vehicle is started, put into drive, or otherwise preparing to begin travel, the vehicle control program 130, or other program, may send a signal to the vehicle sensors, including the camera system 108, to initiate receiving and processing of sensor information, including images from the stereo VL camera.

At 504, the system may send a signal to cause the thermal camera to capture thermal images. For instance, the signal may be triggered in the same manner as discussed above at 502 for the VL camera, or based on a different trigger, such as a time of day, lighting conditions, or the like.

At 505, the system may determine local conditions relevant to performing gain adjustment, such as current weather conditions, time of day, sun position in relation to the thermal camera field of view, road type, and so forth. As discussed additionally below, these and/or other conditions may be used for determining a gain weight for performing gain calibration adjustment of the thermal camera. In some examples, some or all of this information may be determined based on sensor information received from the other sensors 225 discussed above with respect to FIGS. 2 and 3.

At 506, the system may receive a left VL image from the stereo VL camera.

At 508, the system may receive a right VL image from the stereo VL camera.

At 510, the system may receive a thermal image from the thermal camera. For example, the thermal image may be captured and received contemporaneously with the left VL image and the right VL image so that the scene captured by each of the three images is approximately the same.

At 512, the system may generate a disparity map image based on the received left VL image and the received right VL image. For instance, initially, a parallax and disparity may be calculated as discussed above from left and right images. In this example, the disparity map image may be a sparse disparity map image. In other examples, the disparity map image may be a composited sparse and dense disparity map image generated as discussed below with respect to FIGS. 11-14.

At 514, the system may generate an edge image from one of the left or right VL images, such as the right VL image received at 508 in this example. For instance, the edge image may be determined from at least one of the left or right images 506 or 508 using any of various edge detection techniques known in the art. For example, the edge image may indicate edges identified within the right VL image, and the edge information determined for the edge image may help determine how much noise to remove from the disparity map image when determining the disparity edge image as discussed additionally below.

At 516, the system may determine a disparity edge image from the disparity map image determined at 512 and the edge image determined at 514. For example, the disparity edge image may be determined by comparing the disparity map image and the edge image, so that edge image information may be used to retain regions of the disparity map image that have strong edges. These regions may be subsequently selected for gain adjustment while, at the same time, noise from the disparity map image may be filtered out. For instance, the amount of edge information controls how much noise is removed and how much disparity information is outputted. Additional details of determining the disparity edge image are discussed below with respect to FIG. 7.

At 518, the system may determine lane markers and road edge regions in the disparity edge image. For example, various recognition techniques may be applied to the disparity edge image for identifying any lane markers and road edges such as curbs, shoulders, and the like.

At 520, the system may perform axis transformation from the stereo camera image to the thermal image. An example of axial transformation as discussed below with respect to FIG. 8.

At 522, the system may determine regions of interest in the thermal image based on the transformed disparity edge image, including the lane markers and road edge regions recognized in the disparity edge image at 518.

At 524, the system may perform gain adjustment on the thermal sensor calibration based on the regions of interest of the thermal image determined at 522. As one example, the gain adjustment may be performed based on the lookup table discussed below with respect to FIG. 9.

At 526, the system may determine lane markers, road edges, road surface roughness, and so forth, from a thermal image received following the gain adjustment of the thermal sensor calibration. In particular, the system may perform recognition using a thermal image received following gain adjustment for performing the recognition of the features in the image. For example, the thermal image received following gain adjustment typically has superior contrast of significant features to enable more accurate recognition of the road features, obstacles and the like.

Figure 6:
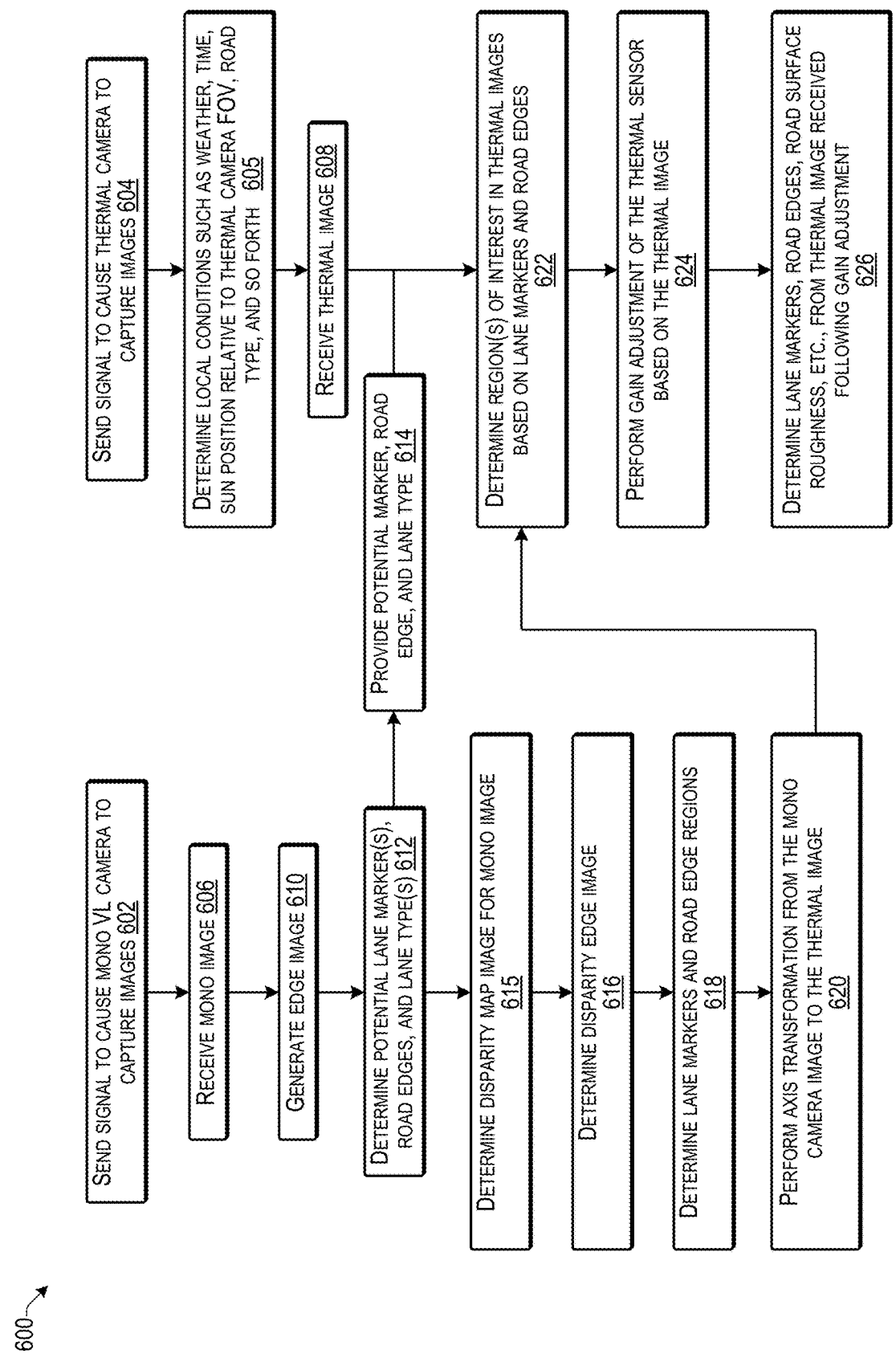
FIG. 6 is a flow diagram illustrating an example process for dynamic gain adjustment using a mono camera image according to some implementations.

FIG. 6 is a flow diagram illustrating an example process 600 for dynamic gain adjustment using a mono camera image according to some implementations. In some examples, the process 600 may be executed by the systems 100, 200, and/or 300 discussed above by execution of the recognition program 128, but with a mono VL camera substituted for the stereo VL camera 110 discussed above.

At 602, the system may send a signal to cause the mono VL camera to capture mono VL images. For example, when the vehicle is started, put into drive, or otherwise preparing to begin travel, the vehicle control program 130, or other program, may send a signal to the vehicle sensors, including the camera system 108, to initiate receiving and processing of sensor information, including images from the mono VL camera.

At 604, the system may send a signal to cause the thermal camera to capture thermal images. For instance, the signal may be triggered in the same manner as discussed above at 602 for the VL camera, or based on a different trigger, such as a time of day, lighting conditions, or the like.

At 605, the system may determine local conditions relevant to performing gain adjustment, such as current weather conditions, time of day, sun position in relation to the thermal camera field of view, road type, and so forth. As discussed additionally below, these and/or other conditions may be used for determining a gain weight for performing gain calibration adjustment of the thermal camera. In some examples, some or all of this information may be determined based on sensor information received from the other sensors 225 discussed above with respect to FIGS. 2 and 3.

At 606, the system may receive a mono VL image from the mono VL camera.

At 608, the system may receive a thermal image from the thermal camera. For example, the thermal image may be captured and received contemporaneously with the mono VL image so that the scene captured by the mono and thermal images is approximately the same.

At 610, the system may generate an edge image from the mono VL image. For instance, the edge image may be determined using any of various edge detection techniques known in the art. The edge image may indicate edges identified within the mono VL image.

At 612, the system may determine potential lane markers in the edge image. For instance, any of various recognition techniques may be used for recognizing lane markers in the edge image.

At 614, the system may provide potential recognized lane marker types for use in determining regions of interest in the thermal camera image.

At 615, the system may determine a disparity image from the mono VL image. For instance, the system may employ a machine learning model that has been trained to determine a disparity map for mono camera images, such as based on comparing successive mono camera images with each other, or the like. As one example, an artificial neural network, such as a convolutional neural network, or other type of machine learning model, may be trained using a training set of mono images at known vehicle speeds for enabling the machine learning model to subsequently generate disparity maps from mono camera images based on a known vehicle speed. Further, other techniques for generating disparity maps from one or more mono camera images will be apparent to those of skill in the art having the benefit of the disclosure herein. In addition, in alternative examples, a disparity map is not generated and the edge image alone may be used for determining the regions of interest.

At 616, the system may determine a disparity edge image from the disparity map image determined at 615 and the edge image determined at 610. For example, the disparity edge image may be determined by comparing the disparity map image and the edge image, so that edge image information may be used to retain regions of the disparity map image that have strong edges. These regions may be subsequently selected for gain adjustment while, at the same time, noise from the disparity map image may be filtered out. For instance, the amount of edge information controls how much noise is removed and how much disparity information is outputted. Additional details of determining the disparity edge image are discussed below with respect to FIG. 7.

At 618, the system may determine lane markers and road edge regions in the disparity edge image. For example, various recognition techniques may be applied to the disparity edge image for identifying any lane markers and road edges such as curbs, shoulders, and the like.

At 620, the system may perform axis transformation from the mono camera image to the thermal image. An example of axial transformation as discussed below with respect to FIG. 8.

At 622, the system may determine regions of interest in the thermal image based on the potential lane marker types and the transformed disparity edge image including the lane marker regions and road edge regions recognized in the disparity edge image at 618.

At 624, the system may perform gain adjustment of the thermal sensor calibration based on the regions of interest of the thermal image determined at 522. As one example, the gain adjustment may be performed based on the lookup table discussed below with respect to FIG. 9.

At 626, the system may determine lane markers, road edges, road surface roughness, and so forth, from a thermal image received following the gain adjustment of the thermal sensor calibration. In particular, the system may perform recognition using a thermal image received following gain adjustment for performing the recognition of the features in the image. For example, the thermal image received following gain adjustment typically has superior contrast of significant features to enable more accurate recognition of the road features, obstacles and the like.

Figure 7:
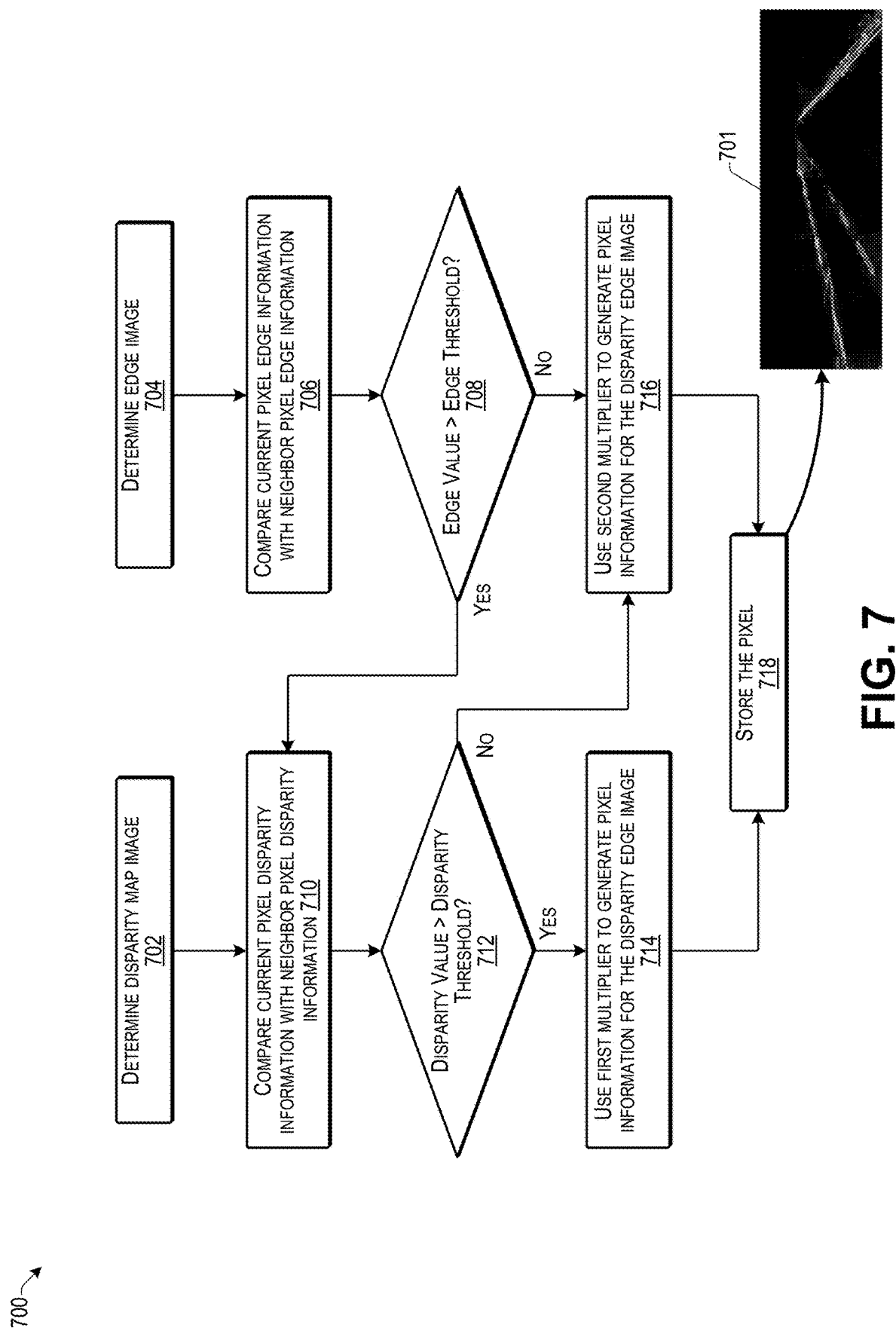
FIG. 7 is a flow diagram illustrating an example process for generating a disparity edge image according to some implementations.

FIG. 7 is a flow diagram illustrating an example process 700 for generating a disparity edge image 701 according to some implementations. In some examples, the process 700 may be executed by the systems 100, 200, and/or 300 discussed above by execution of the recognition program 128. For instance, after calculating the disparity map image discussed above with respect to FIG. 5 or 6, the system may use the respective edge image to remove pixels with invalid disparity values from the disparity image to obtain an edge disparity image. For instance, the amount of edge information in the respective edge image may control how much noise to remove from the disparity image and/or how much disparity information to include in the edge disparity image.

At 702, the system receives a newly determined disparity map image. For instance, the disparity map image may be determined as discussed above with respect to FIGS. 4-6.

At 704, the system receives a newly determined edge image. For instance, the edge image may be determined as discussed above with respect to FIGS. 5 and 6.

At 706, the system may determine, for each pixel in the edge image, whether a difference between a selected current pixel's edge value and that of a neighboring pixel's edge value is greater than an edge threshold.

At 708, if the pixel's edge value is greater than the edge threshold, the process goes to 710. If not, then the process goes to 716. As one example, the edge threshold ETH may be derived using statistical analysis on large sets of image data. For instance, the image data may cover various scenarios such as different road surface conditions (e.g., different road surface color, such as asphalt or concrete and so forth), weather conditions, time of the day, and the like. Further, the edge threshold ETH may be updated based on weather and road surface conditions.

At 710, when the pixel's edge value is greater than the edge threshold, the system may compare the current pixel's disparity information to a neighboring pixel's disparity information to determine whether the current pixel's disparity value is greater than a disparity threshold $D_{TH}$. As one example, the disparity threshold $D_{TH}$ may be derived using statistical analysis on large sets of image data. For instance, the image data may cover various scenarios such as different road surface conditions (e.g., different road surface color, such as asphalt or concrete and so forth), weather conditions, time of the day, and the like. Further, the disparity threshold $D_{TH}$ may be updated based on weather and road surface conditions. The system may determine the disparity value from the corresponding pixel location in the disparity map image received at 702.

At 712, if the pixel's disparity value is greater than the disparity threshold $D_{TH}$, the process goes to 714. If the pixel's disparity value is not greater than the disparity threshold $D_{TH}$, the process goes to 716.

At 714, when the current pixel's disparity value is greater than the disparity threshold, the system may use a first multiplier to generate a pixel disparity value for the disparity edge image.

At 716, when the pixel's edge value is not greater than the edge threshold or the pixel's disparity value is not greater than the disparity threshold, the system may use a second multiplier to generate a disparity value for the current pixel.

At 718, the system may store the current pixel's disparity value to the edge disparity image 701. The process 700 may be performed for each pixel in the disparity and edge images.

Figure 8:
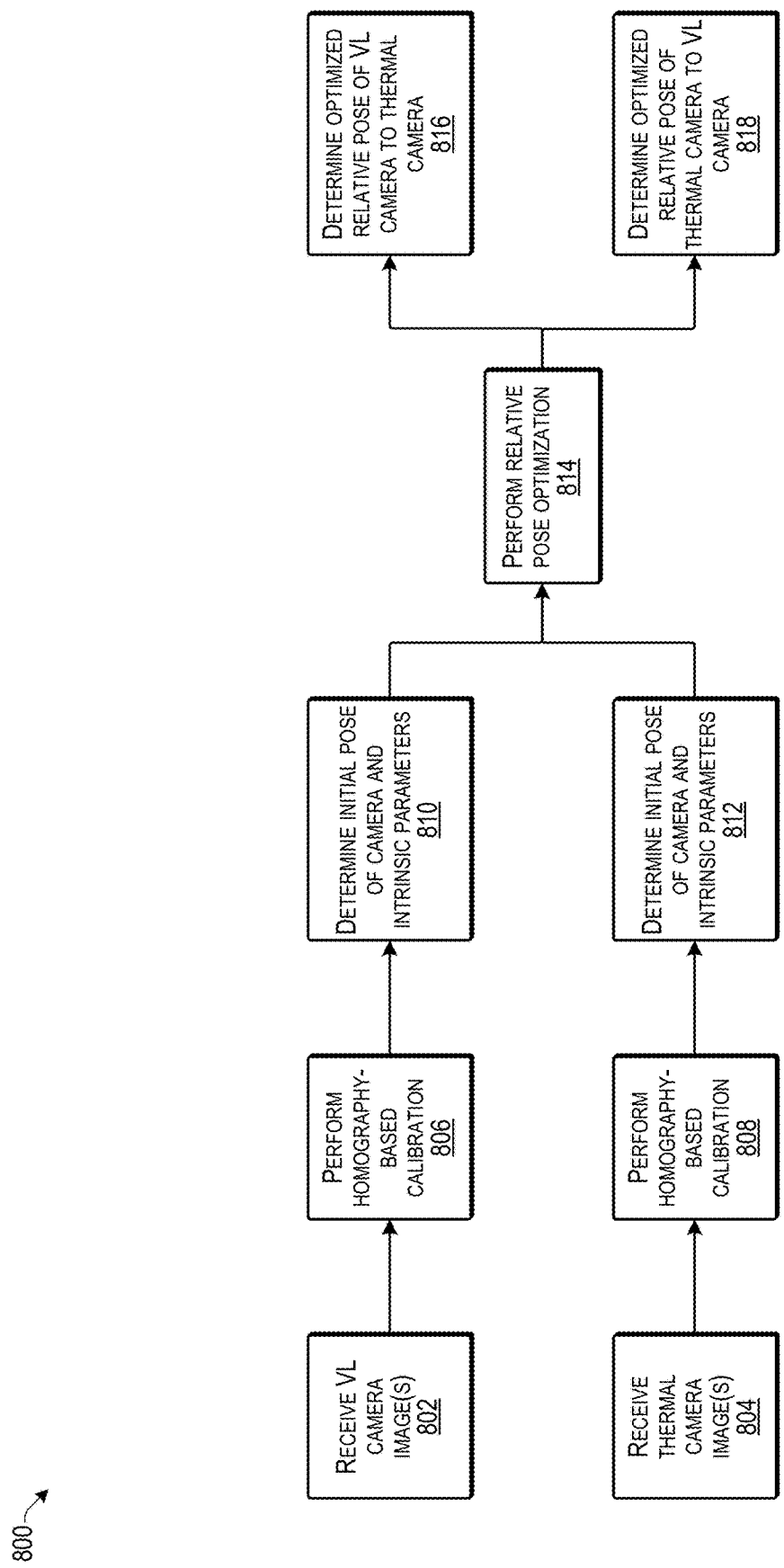
FIG. 8 illustrates an example process for determining a relative pose of a visible light camera to a thermal camera or vice versa according to some implementations.

FIG. 8 illustrates an example process 800 for determining a relative pose of a VL camera to a thermal camera or vice versa according to some implementations. In some examples, the process 800 may be executed by the systems 100, 200, and/or 300 discussed above by execution of the recognition program 128, and may correspond to block 520 of FIG. 5 and/or block 620 of FIG. 6. For example, the axis of the thermal camera may be different from the axis of the visible light camera, and therefore an axis transformation may be performed for aligning portions of the edge disparity map image with the relevant portion of the thermal image.

At 802, the system may receive one or more VL camera images. At 804, the system may receive one or more thermal camera images.

At 806, the system may perform homography-based calibration on the received VL image(s).

At 808, the system may perform homography-based calibration on the received thermal image(s).

At 810, the system may determine an initial pose and camera intrinsic parameters for the VL camera.

At 812, the system may determine an initial pose and camera intrinsic parameters for the thermal camera.

At 814, the system may perform relative pose optimization based on the information determined at 810 and 812.

At 816, the system may determine optimized relative pose of the VL camera relative to the thermal camera.

At 818, the system may determine optimized relative pose of the thermal camera relative to the VL camera. Accordingly, using the process above, selected regions of an image may be transformed from the VL camera image axis to the thermal camera image axis, or vice versa.

Figure 9:
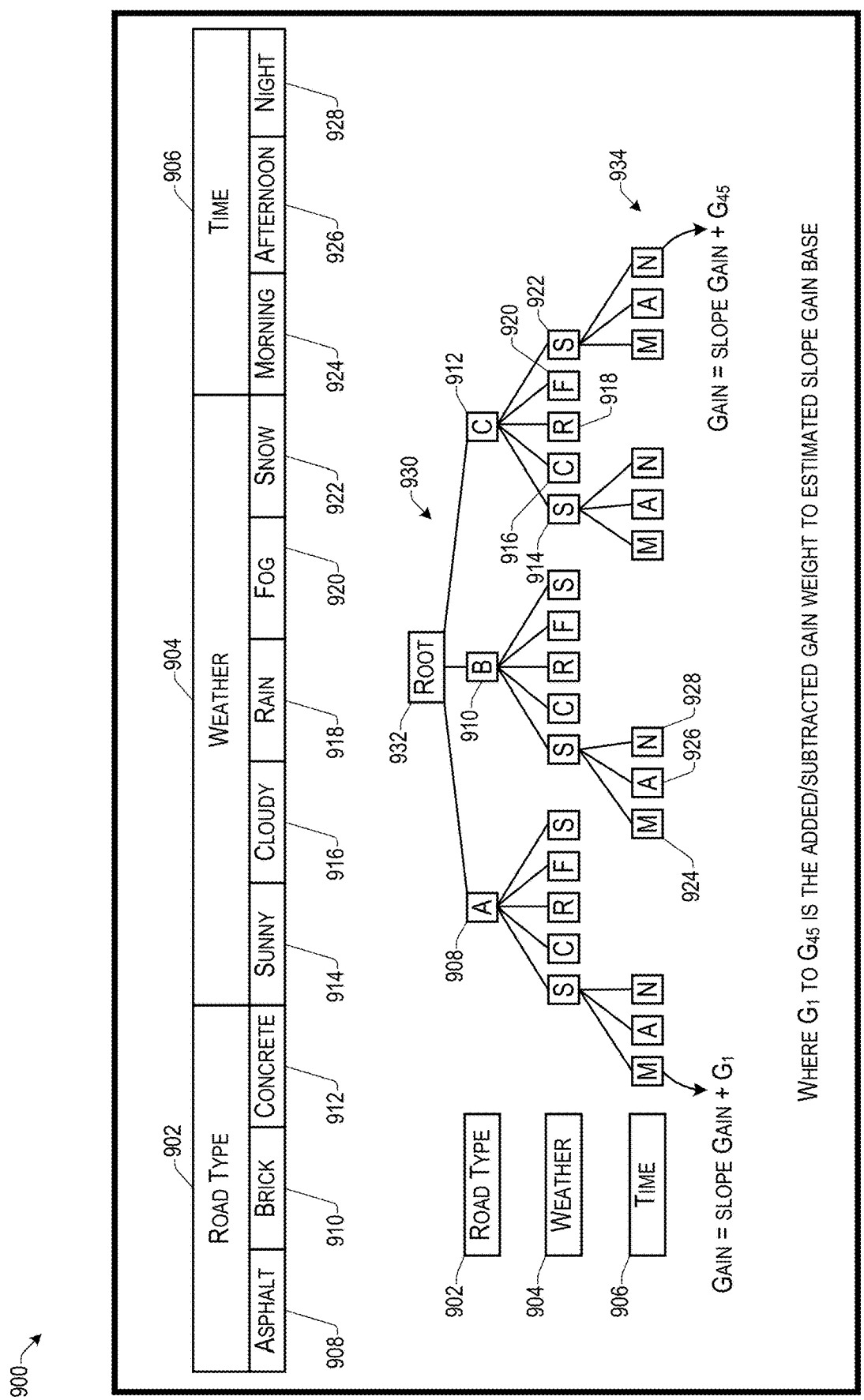
FIG. 9 illustrates an example lookup table and decision tree for selecting a gain weight according to some implementations.

FIG. 9 illustrates an example lookup table and decision tree 900 for selecting a gain weight according to some implementations. For instance, as discussed above with respect to FIG. 5, block 524, and FIG. 6, block 624, the system may perform dynamic gain adjustment of the calibration of a thermal sensor of the thermal camera 112 discussed above. As one example, the gain adjustment may be based on accessing the lookup table and decision tree 900 for determining a gain weight for performing the gain adjustment, rather than having to perform gain adjustment calculations each time. For instance, after the axis of each region is transformed from the VL camera axis to the thermal camera axis, one or more regions of interest may be selected and the gain adjustment may be dynamically determined for gain values using calibration of the thermal sensor's pixels, such as in the case that the thermal sensor may be a microbolometer or other thermal sensor.

In some examples, the region of interest may be calculated by finding minimum and maximum values of rows and columns considering all selected regions. Based on the region of interest, each pixel's gain may be calculated intelligently. The following equation is an example of a linear equation which shows how gain may be calculated in some examples:

$$\text{Slope Gain}_{(i,j)} = A_{pix} * W_{obj} * R_{(i,j)} * \Theta_{fpa} \qquad \text{EQ(3)}$$

where, $A_{pix}$=Pixel area; $W_{obj}$=objected projected angle; $R_{(i,j)}$=the sensor's temperature dependent responsivity; and $\Theta_{fpa}$=the sensor's temperature.

The lookup table and decision tree 900 may be determined in advance so that gain weight for the slope gain values may be predetermined based on various different conditions such as road type 902, weather 904, and time 906. The road type 902 may be categorized into various different road types such as asphalt 908, brick 910, and concrete 912. In addition, the weather 904 may be categorized into various different weather types such as sunny 914, cloudy 916, rain 918, fog 920, and snow 922. Further, the time 906 may be categorized into various different times such as morning 924, afternoon 926, and night 928. For instance, to determine a gain adjustment for a thermal image, the decision tree 930 may be navigated from a root 932 to one of 45 different leaves 934 based on a current detected road type 902, weather 904, and time 906. A different respective gain weight $G_1$ to $G_{45}$ may be associated with each of the respective leaves 934. Further, while a decision tree 930 is illustrated in FIG. 9, any other suitable type data structure may be employed for achieving the same result.

In addition, the conditions used for the lookup table and decision tree 900 of FIG. 9 are not limited to those included in this example, and may include fewer, other, or additional conditions. As one example, the position of the sun relative to the FOV of the thermal camera may be taken into consideration. For example, depending on its position, the sun may direct light toward the thermal camera, or may direct light from the side or rear of the thermal camera. Further, the relative position of the thermal camera to the sun may change dynamically as the vehicle travels and changes direction, and in some cases, the gain of the thermal camera may be dynamically adjusted accordingly.

Figure 10:
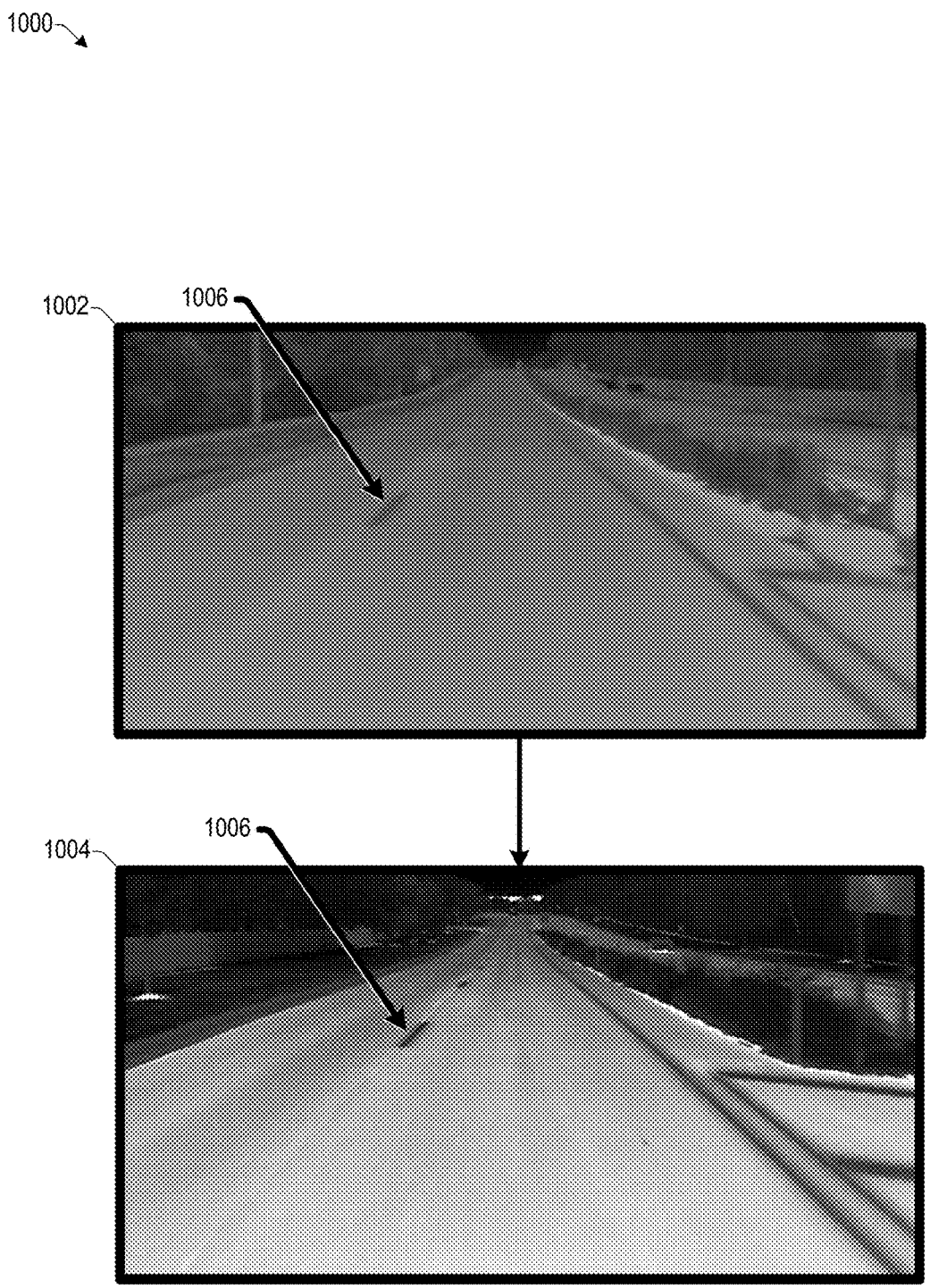
FIG. 10 illustrates example thermal images before and after the dynamic calibration adjustment according to some implementations.

FIG. 10 illustrates example thermal images 1000 before and after the dynamic calibration adjustment according to some implementations. For example, suppose that a first image 1002 is initially received from the thermal camera prior to the dynamic gain adjustment. Subsequently, the dynamic gain adjustment procedure may be applied to the calibration of the thermal sensor of the thermal camera so that a subsequent second image 1004 may have improved contrast and feature recognizability. For example, in the first image 1002, a lane marker 1006 blends in with the road surface substantially more than in the second image 1004. The dynamic gain adjustment may be performed continually as conditions change, such as road surface, weather and time. Furthermore, while road surface, weather, and time are provided as three examples of conditions, other conditions that may be employed for gain adjustment will be apparent to those of skill in the art having the benefit of the disclosure herein.

Figure 11:
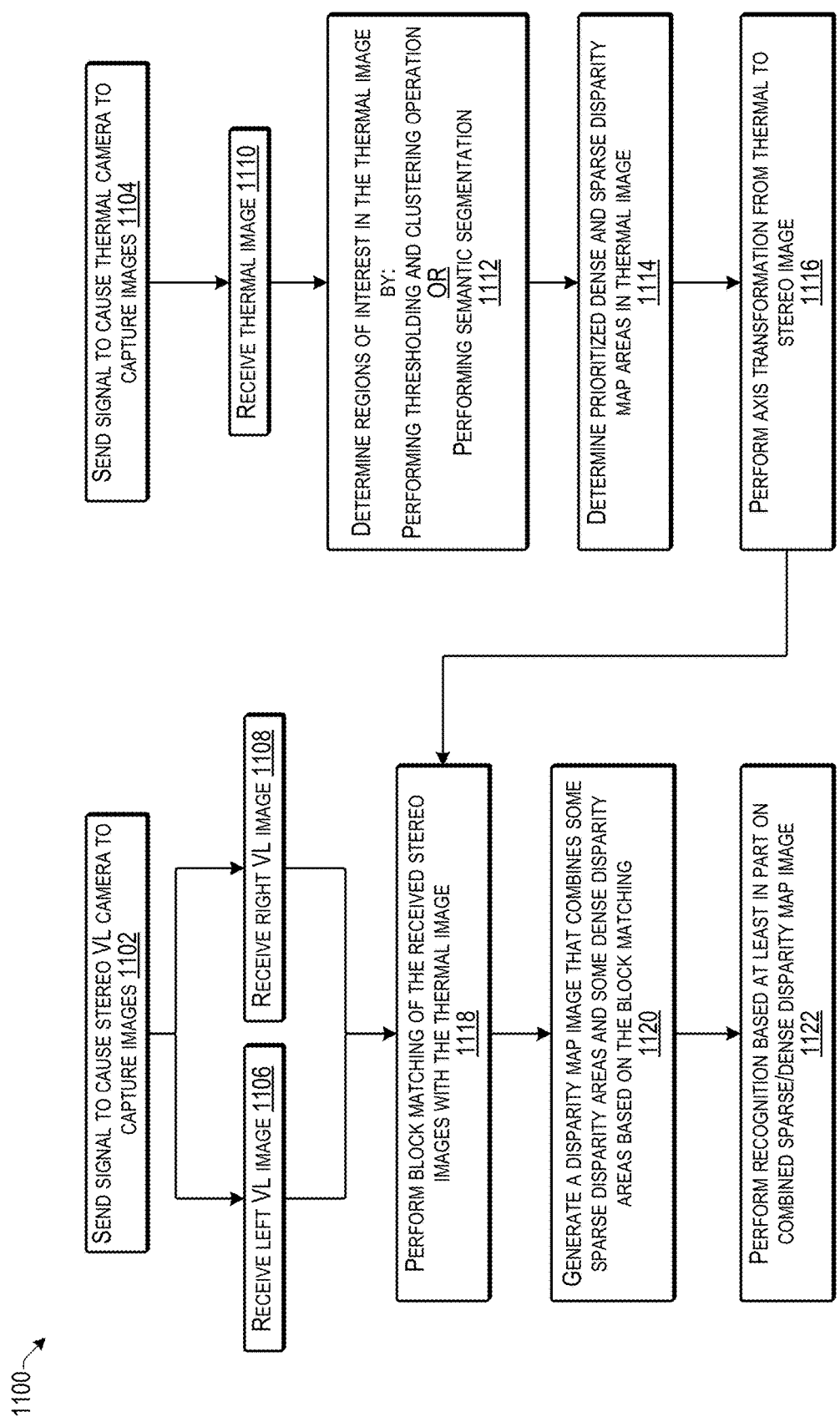
FIG. 11 is a flow diagram illustrating an example process for generating a disparity map that combines sparse and dense disparity areas according to some implementations.

FIG. 11 is a flow diagram illustrating an example process 1100 for generating a disparity map that combines sparse and dense disparity areas according to some implementations. In some examples, the process 1100 may be executed by the systems 100, 200, and/or 300 discussed above by execution of the recognition program 128.

At 1102, the system may send a signal to cause the stereo VL camera to capture VL images. For example, when the vehicle is started, put into drive, or otherwise preparing to begin travel, the vehicle control program 130, or other program, may send a signal to the vehicle sensors, including the camera system 108, to initiate receiving and processing of sensor information, including images from the stereo VL camera.

At 1104, the system may send a signal to cause the thermal camera to capture thermal images. For instance, the signal may be triggered in the same manner as discussed above at 502 for the VL camera, or based on a different trigger, such as a time of day, lighting conditions, or the like.

At 1106, the system may receive a left VL image from the stereo VL camera.

At 1108, the system may receive a right VL image from the stereo VL camera.

At 1110, the system may receive a thermal image from the thermal camera. For example, the thermal image may be captured and received contemporaneously with the left VL image and the right VL image so that the scene captured by each of the three images is approximately the same. In some examples, the thermal image may be received following the gain adjustment discussed above with respect to FIGS. 5-10.

At 1112, the system may determine regions of interest in the thermal image to decide areas for generating sparse and dense disparity map information. For instance, the system either may (1) employ a thresholding operation followed by a clustering operation, or (2) may employ a semantic segmentation network, such as by using deep learning or instance segmentation. In the case of the thresholding and clustering operation, a first threshold indicative of temperature may initially be applied to each of the pixels in the captured image. For instance, pixels having values that are lower than a specified threshold may be considered to be lower temperature areas and may be removed, while pixels that exceed the threshold may be considered hot spots and may be preserved. Accordingly, the system may segment the captured image based on the grey level or grey value of each pixel as being above or below the threshold.

Alternatively, when using the semantic segmentation network and deep learning instance segmentation or other machine learning model to determine the regions of interest, the pixels in an image may first be classified into a corresponding segment and class. For instance, each class and segment may denote the road surface characteristics. A database of a large set of thermal images may be compiled as training data, which may include images captured under a variety of different scenarios and conditions, such as different weather conditions, different times of day and night, different road surface types, etc. The thermal images in the training data may also include images containing various obstacles and road features, such as pedestrians, vehicles, traffic lights, road curbs, streetlights, traffic signs, and so forth. Once the database and corresponding labels are prepared, the semantic segmentation network may be trained using a first portion of the training data images, and the trained machine learning model may be evaluated and tuned using a second portion of the training data images to ensure accurate output. Subsequently, during use, a captured thermal image may be inputted to the trained machine learning model and the trained model may output the regions of interest. Accordingly, as discussed below, the regions of interest may be subject to dense disparity processing, while the remainder of the image may be subject to sparse disparity processing.

At 1114, the system may determine prioritized dense and sparse disparity map areas in the thermal image. For example, using a clustering operation, clusters of hot spots may be identified as high priority areas, and based on this, the lower priority and higher priority areas of the image may be determined. In particular, the lower priority areas may be subject to sparser disparity processing, while the higher priority areas may be subject to denser disparity processing. Further, the higher and lower priority area may be selected in part based on types of obstacles, distance information, and so forth. For example, each cluster may be considered individually such as based on the type of the obstacle, the distance to the object, etc., and the system may assign a priority to each cluster for generating the sparse and dense disparity map.

At 1116, the system may perform acts as transformation from thermal to stereo image. An example process for performing this operation is discussed above, e.g., with respect to FIG. 8.

At 1118, the system may perform block matching of the thermal image to the received stereo VL images to map the prioritized dense disparity areas to the VL images. For example, the system may match blocks of the stereo VL images with the thermal image for mapping the higher priority areas to the VL images.

At 1120, the system may generate a disparity map image that combines some sparse disparity areas and some dense disparity areas based on the block matching. For instance, the system may calculate dense disparity only for the higher priority regions whereas the other regions with lower priority only sparse disparity is calculated. Accordingly, implementations herein are able to provide higher accuracy of recognition while reducing the amount of processing resources required for doing so. As one example, in areas that are labeled as being lower priority, the image may be downsampled before performing disparity map calculations and sparse matching algorithms may be used to establish a set of robust matches between an image pair. On the other hand, for higher priority areas, the disparity map image may be calculated without down sampling the stereo image pairs, and dense matching algorithms may be used to find matches for all points in the respective images.

As a more specific example, for calculating the sparser disparity areas, a ZSAD (Zero mean Sum of Absolute Difference) based stereo block matching algorithm may be used with downsampling of the low priority image areas. Further, for calculating denser disparity map areas, a semi-global matching (SGM) algorithm may be used without downsampling the image. Additionally, such as in the case that a low-cost ECU or other processor is used for performing the disparity map calculations, the same ZSAD stereo block matching technique may be employed for both the sparser disparity map calculations and the denser disparity map calculations; however, in the case of the sparser disparity map calculations, the image may first be downsampled, while for the denser disparity map calculations, the downsampling might not be performed.

At 1122, the system may perform recognition based at least in part on the combined sparse/dense disparity map image. For example, the system may perform recognition of features in the disparity map image using any of various recognition techniques known in the art. Furthermore, while the example of FIG. 11 is described with respect to stereo left and right VL images, in other examples, the process 1100 may be performed with images received from a mono VL camera.

Figure 12:
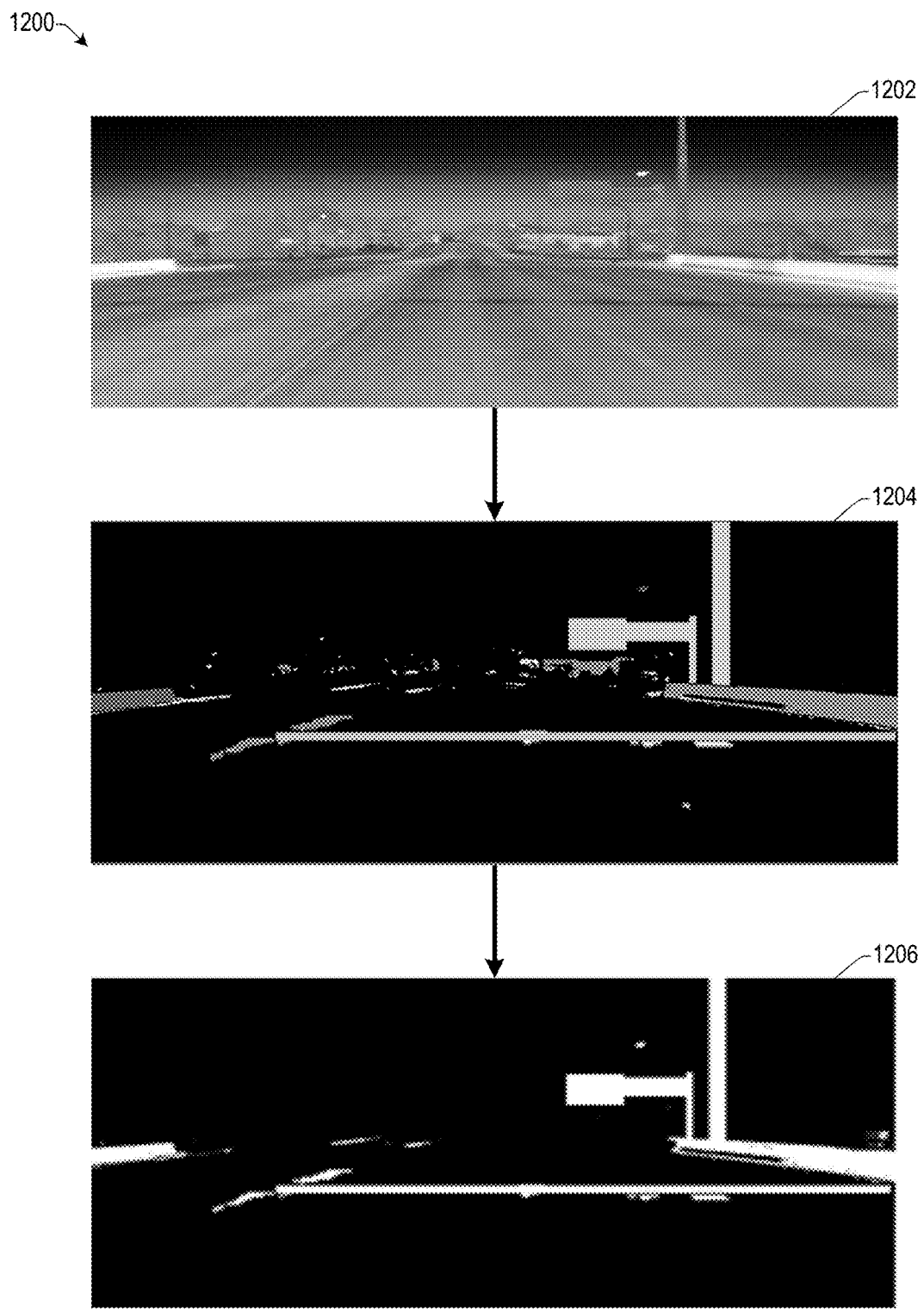
FIG. 12 illustrates example images for determining higher and lower priority areas according to some implementations.

FIG. 12 illustrates example images 1200 for determining higher priority and lower priority areas according to some implementations. For instance, a first image 1202 shows an example of a thermal image received from the thermal camera. A second image 1204 shows a result of processing of the first image 1202 such as by using semantic segmentation or other machine learning method as discussed above or alternatively using the thresholding and clustering techniques discussed above. In addition, a third image 1206 shows the prioritized areas selected by the region of interest selection processing in which the higher priority areas are shown in white and the lower priority areas are shown in black.

Figure 13:
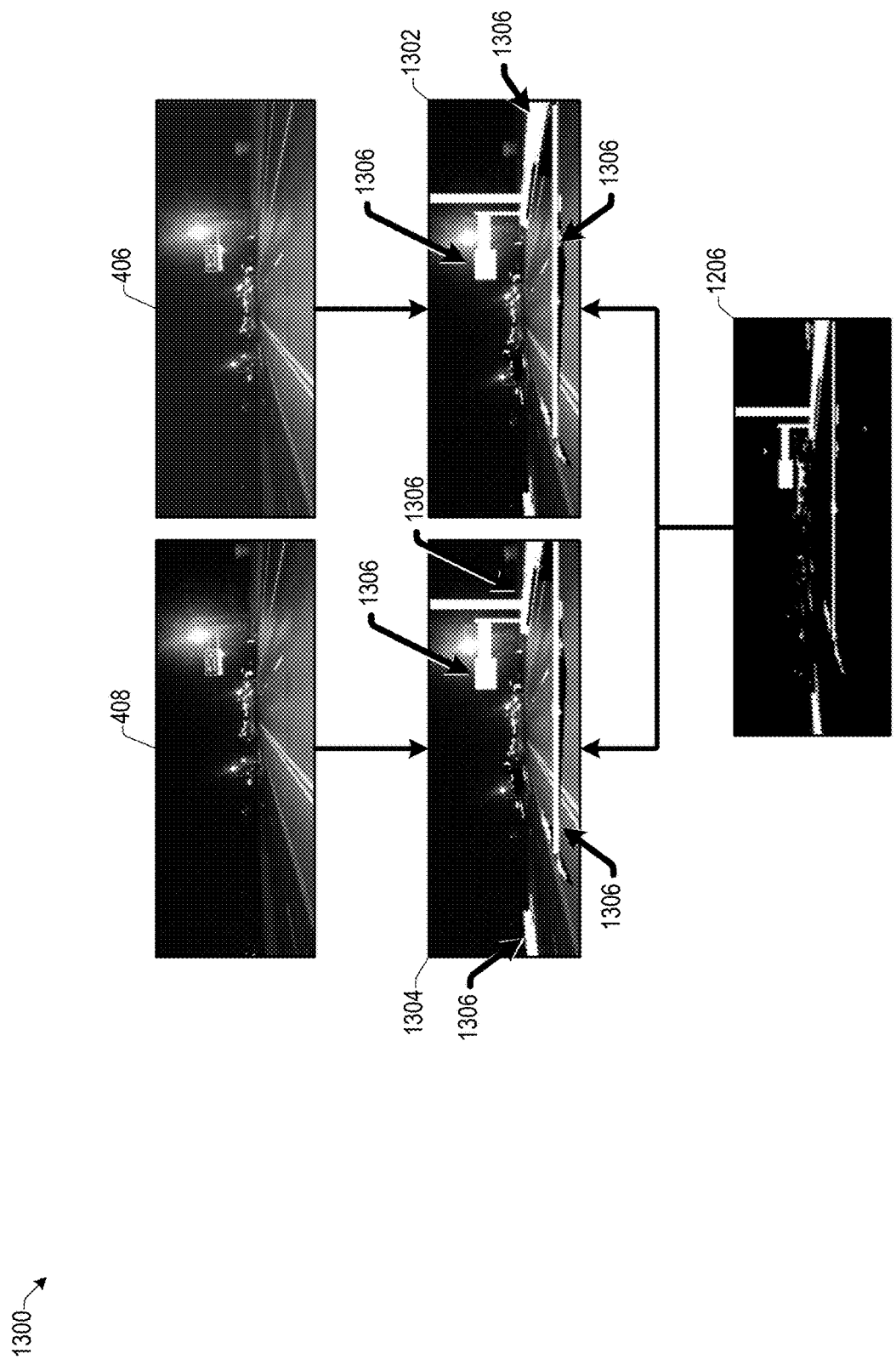
FIG. 13 illustrates an example of block matching to determine higher priority areas in the stereo images according to some implementations.

FIG. 13 illustrates an example 1300 of block matching to determine high priority areas in the stereo images according to some implementations. In this example, block matching is performed between a thermal image with the prioritized areas identified and stereo VL images received from the VL camera. For instance, suppose that the third image 1206 of FIG. 12 is a block matched with the right stereo image 406 and the left stereo image 408 discussed above with respect to FIG. 4. As illustrated at 1302 and 1304, the block matching results in prioritized areas 1306 being identified in the respective stereo images 1302 and 1304. As mentioned above, denser disparity map processing may be performed for the higher priority areas, while sparser disparity map processing may be performed for the lower priority areas.

Figure 14:
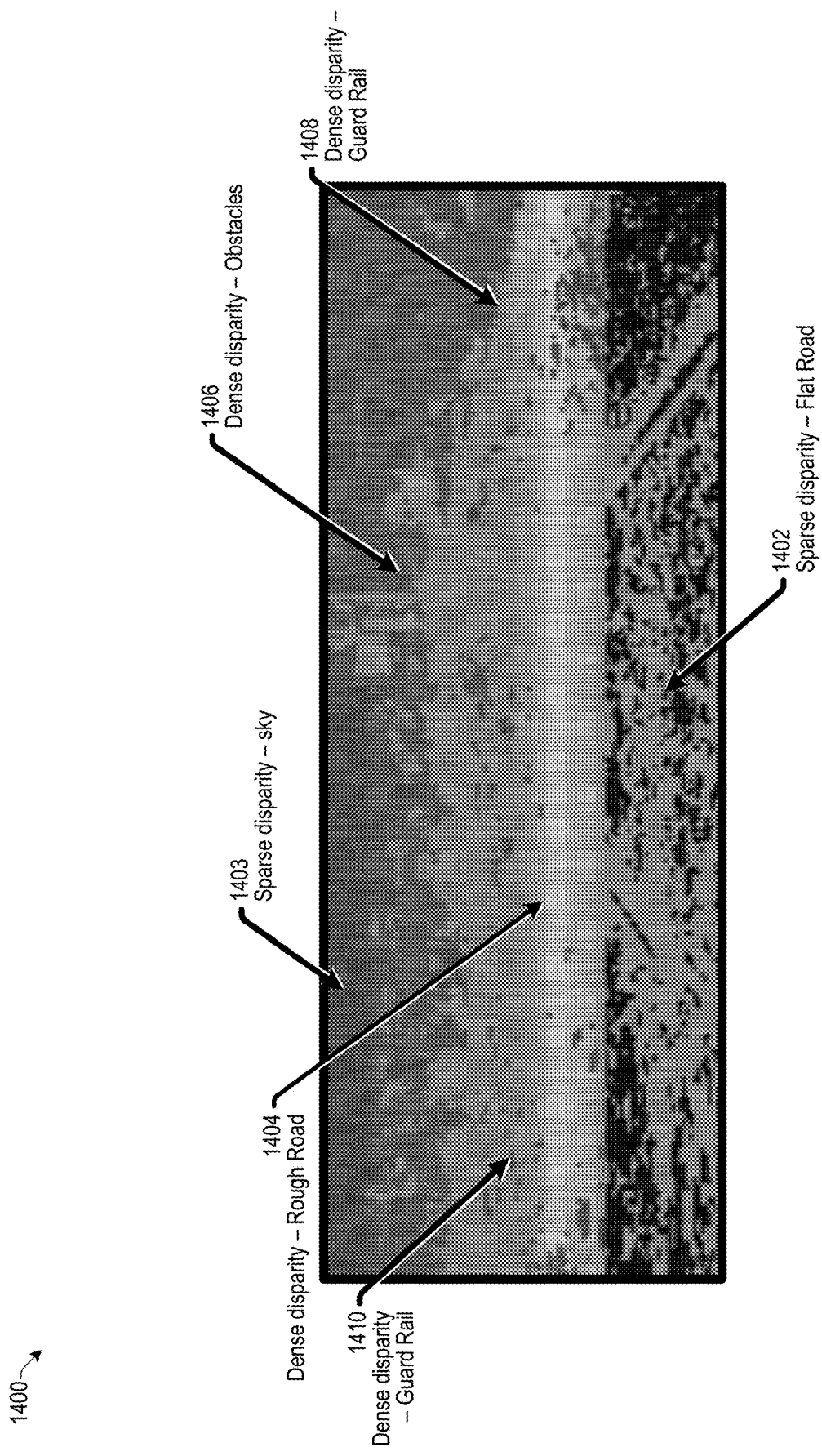
FIG. 14 illustrates an example disparity map image having combined sparse and dense disparity areas determined according to some implementations.

FIG. 14 illustrates an example disparity map image 1400 having combined sparse and dense disparity areas determined according to some implementations. In this example, the higher priority areas have been calculated using dense disparity map processing while the lower priority areas have been calculated using sparse disparity map processing. Accordingly, as indicated at 1402 and 1403 sparse disparity map processing was used when determining a flat road area of the image and a sky area of the image. On the other hand, as indicated at 1404, dense disparity map processing was used when determining a rough road area. Similarly, dense disparity map processing was used at 1406 for obstacles, 1408 for a right guardrail, and 1410 for a left guardrail. Accordingly, only portions of the disparity map 1400 are calculated using dense disparity map calculation techniques thereby reducing the amount of processing required for generating the disparity map image 1400.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
one or more processors configured by executable instructions to perform operations comprising:
receiving at least one first visible light image and a first thermal image;
generating, from the at least one first visible light image, an edge image that identifies edge regions in the at least one first visible light image;
determining at least one of a lane marker or road edge region based at least in part on information from the edge image;
determining one or more first regions of interest in the first thermal image based on the at least one of the lane marker or the road edge region;
adjusting a gain of a thermal sensor based on the one or more first regions of interest in the first thermal image;
receiving one or more second visible light images and a second thermal image;
determining one or more second regions of interest in the second thermal image;
mapping the one or more second regions of interest to the one or more second visible light images;
generating, from the one or more second visible light images, based on the mapping, a disparity map image that combines one or more denser disparity areas corresponding to the one or more second regions of interest with one or more sparser disparity areas corresponding to areas outside of the one or more second regions of interest;
performing recognition of one of more features in the disparity map image to determine recognition information; and
sending at least one control signal based on the recognition information, the at least one control signal including at least one of:
an instruction for controlling a vehicle to cause the vehicle to accelerate or decelerate;
an instruction for controlling the vehicle to cause the vehicle to steer a wheel of the vehicle; or
an instruction to cause an alert to be presented.

2. The system as recited in claim 1, wherein there are at least two first visible light images, the operations further comprising:
determining a first disparity map image from the first visible light images;
combining information from the first disparity map image with information from the edge image to generate a disparity edge image; and
determining the at least one of the lane marker or the road edge region based on the disparity edge image.

3. The system as recited in claim 2, the operations further comprising performing an axis transformation from the disparity edge image to the first thermal image.

4. The system as recited in claim 2, wherein the at least two first visible light images comprise a left image and a right image received from a stereo visible light camera.

5. The system as recited in claim 1, wherein the at least two first visible light images comprise successive images received from a mono visible light camera.

6. The system as recited in claim 1, wherein the operation of determining the one or more second regions of interest in the second thermal image further comprises:
applying a threshold to pixels of the second thermal image; and
performing clustering on pixels that exceed the threshold to determine the one or more second regions of interest.

7. A method comprising:
receiving, by one or more processors, at least two first visible light images and a first thermal image;
generating, from at least one of the first visible light images, an edge image that identifies edge regions in the at least one first visible light image;
determining a first disparity map image from the plurality of first visible light images;
combining information from the first disparity map image with information from the edge image to generate a disparity edge image;
determining at least one of a lane marker or road edge region based at least on the disparity edge image;
determining one or more first regions of interest in the first thermal image based on the at least one of the lane marker or the road edge region; and
adjusting a gain of a thermal sensor based on the one or more first regions of interest in the first thermal image.

8. The method as recited in claim 7, further comprising:
receiving one or more second visible light images and a second thermal image;
determining one or more second regions of interest in the second thermal image;
mapping the one or more second regions of interest to the one or more second visible light images; and
generating, from the one or more second visible light images, based on the mapping, a disparity map image that combines one or more denser disparity areas corresponding to the one or more second regions of interest with one or more sparser disparity areas corresponding to areas outside of the one or more second regions of interest.

9. The method as recited in claim 8, further comprising:
performing recognition of one of more features in the disparity map image to determine recognition information; and
sending at least one control signal based on the recognition information, the at least one control signal including at least one of:
an instruction for controlling a vehicle to cause the vehicle to accelerate or decelerate;
an instruction for controlling the vehicle to cause the vehicle to steer a wheel of the vehicle; or
an instruction to cause an alert to be presented.

10. The method as recited in claim 7, further comprising adjusting the gain of the thermal sensor based at least in part on navigating a decision tree to determine a gain weight to apply for adjusting the gain, the decision tree including a plurality of gain weights determined based on a plurality of combined conditions.

11. The method as recited in claim 7, further comprising performing an axis transformation from the disparity edge image to the first thermal image.

12. The method as recited in claim 7, wherein the at least two first visible light images comprise a left image and a right image received from a stereo visible light camera.

13. A system comprising:
one or more processors configured by executable instructions to perform operations comprising:
receiving one or more visible light images and a thermal image;
applying a threshold to pixels of the thermal image;
determining one or more regions of interest in the thermal image based at least on performing clustering on pixels that exceed the threshold;
mapping the one or more regions of interest to the one or more visible light images; and
generating, from the one or more visible light images, based on the mapping, a disparity map image that combines one or more denser disparity areas corresponding to the one or more regions of interest with one or more sparser disparity areas corresponding to areas outside of the one or more regions of interest.

14. The system as recited in claim 13, the operations further comprising performing recognition of one of more features in the disparity map image for performing at least one vehicle control function.

15. The system as recited in claim 13, the operations further comprising, prior to receiving the one or more visible light images and the thermal image,
receiving, by one or more processors, at least one prior visible light image and a prior thermal image;
generating, from the at least one prior visible light image, an edge image that identifies edge regions in the at least one prior visible light image;
determining at least one of a lane marker or road edge region based at least in part on information from the edge image;
determining one or more additional regions of interest in the prior thermal image based on the at least one of the lane marker or the road edge region; and
adjusting a gain of a thermal sensor based on the one or more additional regions of interest in the prior thermal image.

16. The system as recited in claim 13, the operations further comprising determining the one or more sparser disparity areas by first down sampling the one or more visible light images.

17. The system as recited in claim 13, wherein the operation of determining the one or more regions of interest in the thermal image further comprises inputting the thermal image to a machine-learning model trained to identify the one or more regions of interest based on a training data.

* * * * *